United States Patent
Yamaguchi et al.

(10) Patent No.: US 7,876,223 B2
(45) Date of Patent: Jan. 25, 2011

(54) RFID TAG INFORMATION COMMUNICATING APPARATUS

(75) Inventors: Koshiro Yamaguchi, Kagamigahara (JP); Kunihiro Yasui, Nagoya (JP); Hisayoshi Wanibe, Chita (JP); Tomoaki Shibata, Nagoya (JP); Shigeki Kato, Toyoake (JP); Shiro Yamada, Kasugai (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 573 days.

(21) Appl. No.: 11/986,737

(22) Filed: Nov. 26, 2007

(65) Prior Publication Data

US 2008/0124162 A1 May 29, 2008

(30) Foreign Application Priority Data

Nov. 28, 2006 (JP) ............................. 2006-320635
Feb. 16, 2007 (JP) ............................. 2007-036952
Sep. 28, 2007 (JP) ............................. 2007-254053

(51) Int. Cl.
*G08B 13/14* (2006.01)

(52) U.S. Cl. ................................. 340/572.1; 235/375
(58) Field of Classification Search ... 340/572.1–572.8; 235/375, 385
See application file for complete search history.

(56) References Cited

U.S. PATENT DOCUMENTS

| | | | | |
|---|---|---|---|---|
| 6,327,972 B2 * | 12/2001 | Heredia et al. | ................. | 101/35 |
| 6,404,335 B1 * | 6/2002 | Ohno et al. | ................. | 340/505 |
| 6,409,401 B1 * | 6/2002 | Petteruti et al. | ............... | 400/88 |
| 6,593,853 B1 * | 7/2003 | Barrett et al. | ............. | 340/572.1 |
| 6,848,616 B2 * | 2/2005 | Tsirline et al. | ............... | 235/449 |
| 6,899,476 B1 * | 5/2005 | Barrus et al. | ............. | 340/572.1 |
| 7,064,716 B2 | 6/2006 | Deguchi | | |
| 7,180,627 B2 * | 2/2007 | Moylan et al. | ........... | 340/10.51 |
| 7,327,265 B2 * | 2/2008 | Tsujimura et al. | ......... | 340/572.7 |
| 7,439,858 B2 * | 10/2008 | Feltz et al. | ............... | 340/572.1 |
| 7,439,865 B2 * | 10/2008 | Murofushi et al. | ....... | 340/572.8 |
| 7,609,406 B2 * | 10/2009 | Roth et al. | ................ | 340/572.1 |
| 2004/0032443 A1 * | 2/2004 | Moylan et al. | ................. | 347/19 |
| 2009/0072974 A1 * | 3/2009 | Miyashita et al. | ........ | 340/572.1 |

FOREIGN PATENT DOCUMENTS

| | | |
|---|---|---|
| JP | 2004082432 | 3/2004 |
| JP | 2004206243 | 7/2004 |
| JP | 2005186567 | 7/2005 |
| JP | 2005298100 | 10/2005 |
| JP | 2006040023 | 2/2006 |

* cited by examiner

*Primary Examiner*—Eric M Blount
(74) *Attorney, Agent, or Firm*—Day Pitney LLP

(57) ABSTRACT

An RFID tag information communicating apparatus includes a feeding roller driving shaft that is provided within a housing constituting a shell of an apparatus main body and feeds a base tape, and an antenna for label production and an antenna for information transmission and reception, which are capable of transmitting and receiving information with an RFID circuit element for label production included in a base tape and an RFID circuit element for information transmission and reception located outside the housing. Each of the RFID circuit elements has an IC circuit part that stores information and an antenna that transmits and receives information. The apparatus is configured capable of performing both of the information reading and information writing with the RFID circuit element for label production and the RFID circuit element for information transmission and reception via the antennas.

20 Claims, 18 Drawing Sheets

[FIG.1]
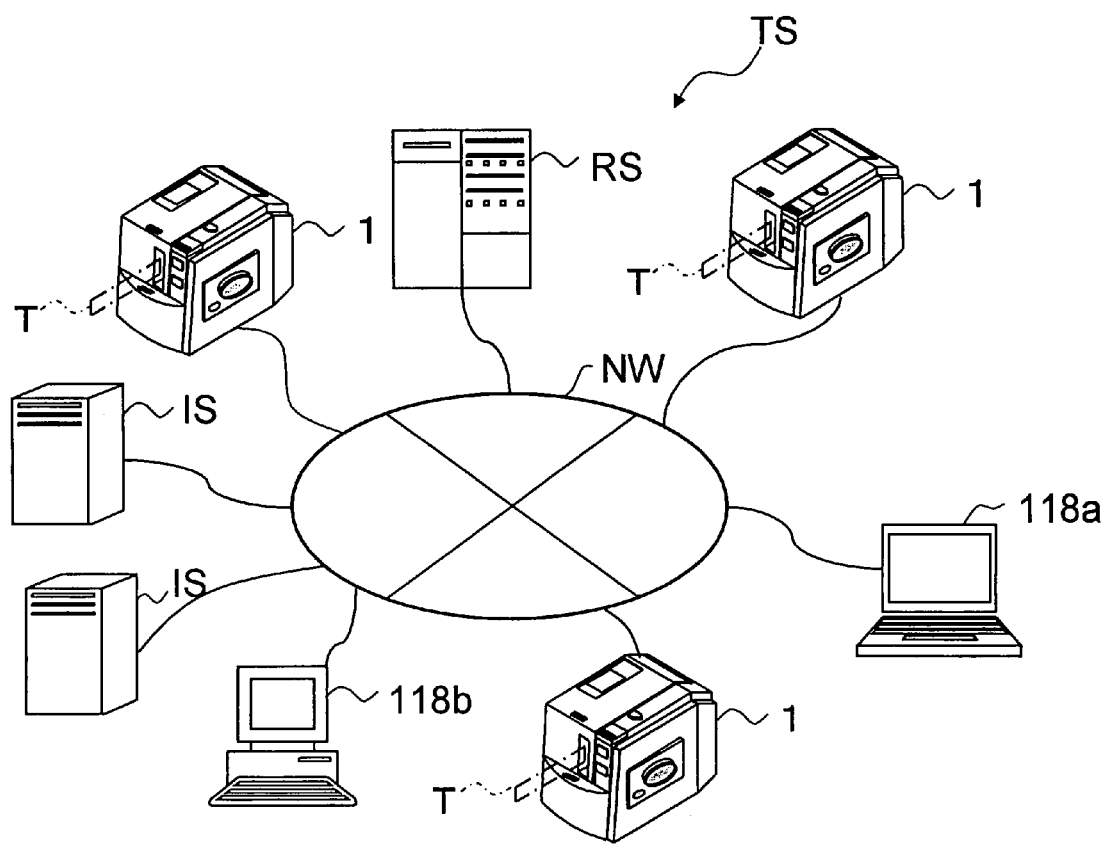

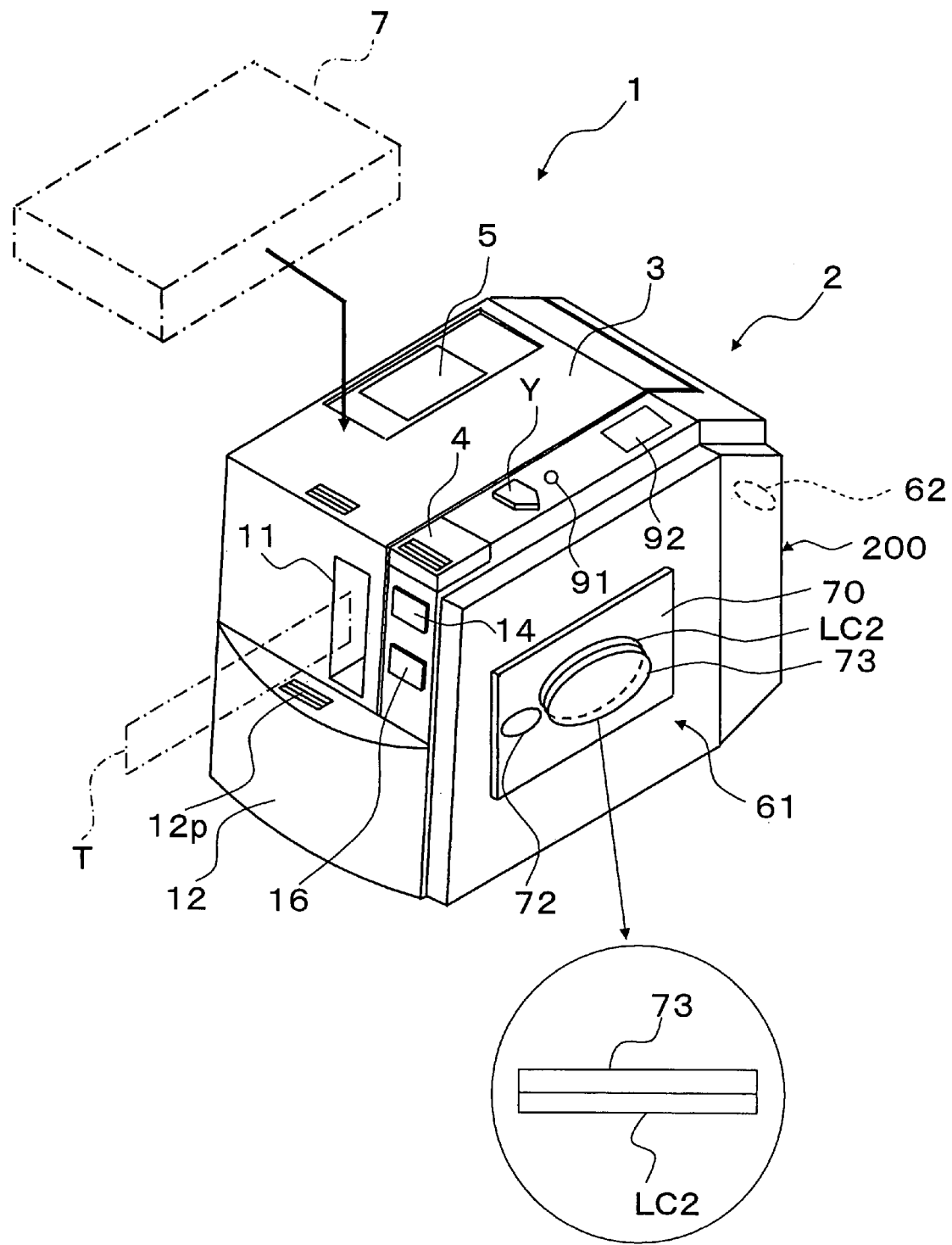
[FIG.2]

[FIG.3]
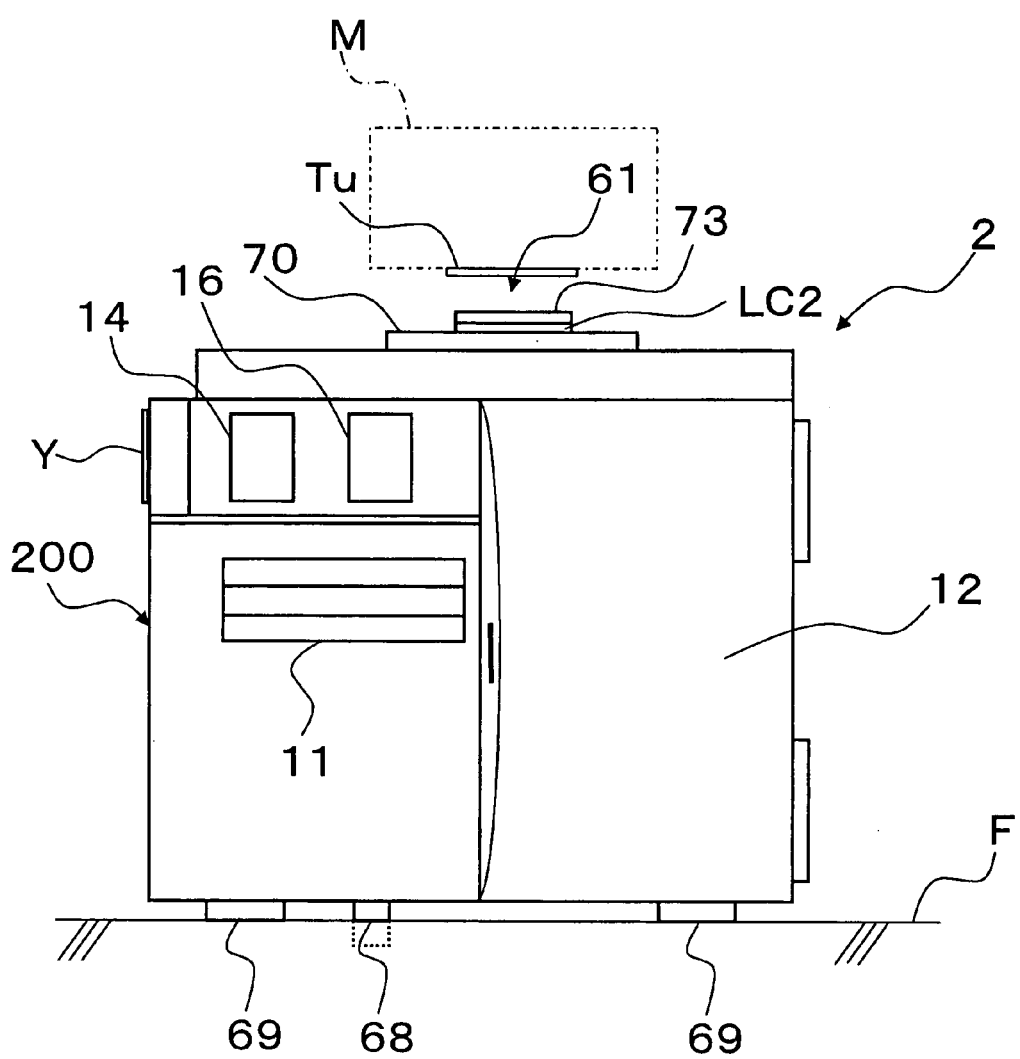

[FIG.4]
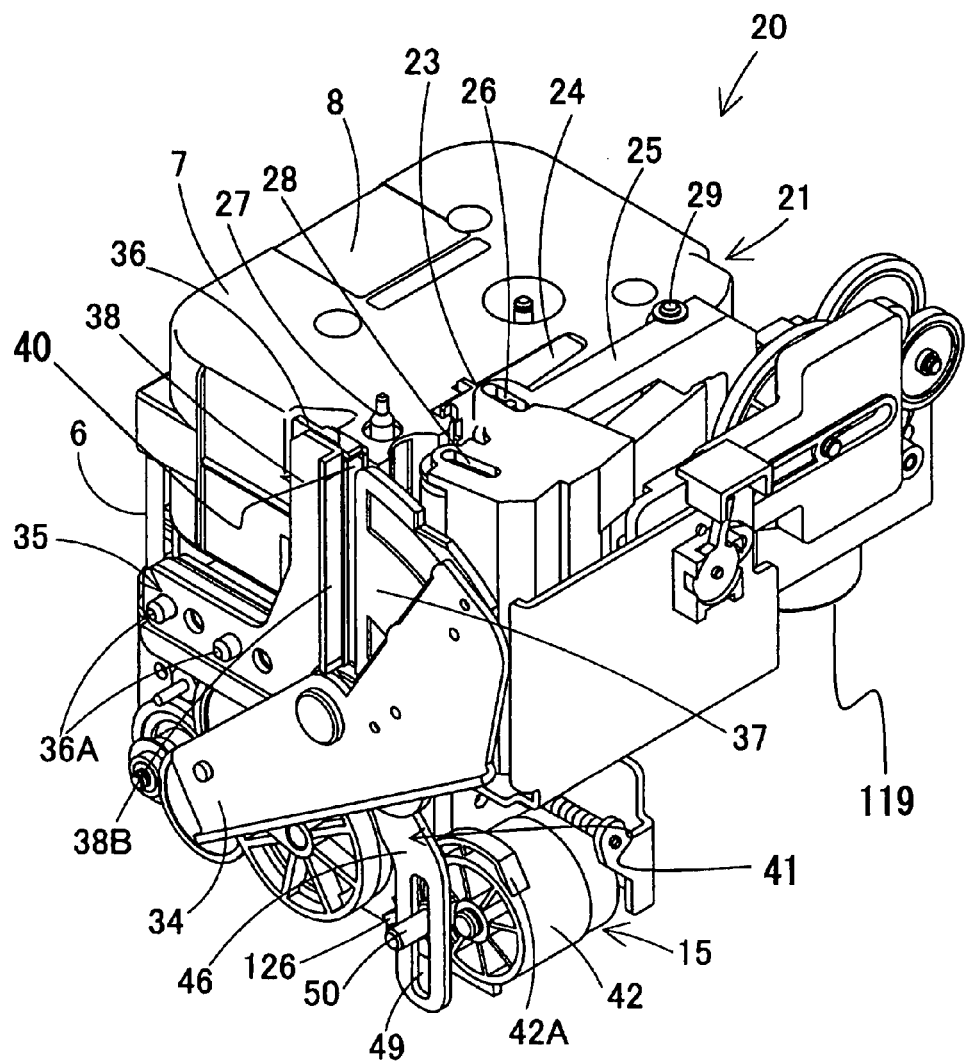

[FIG.5]
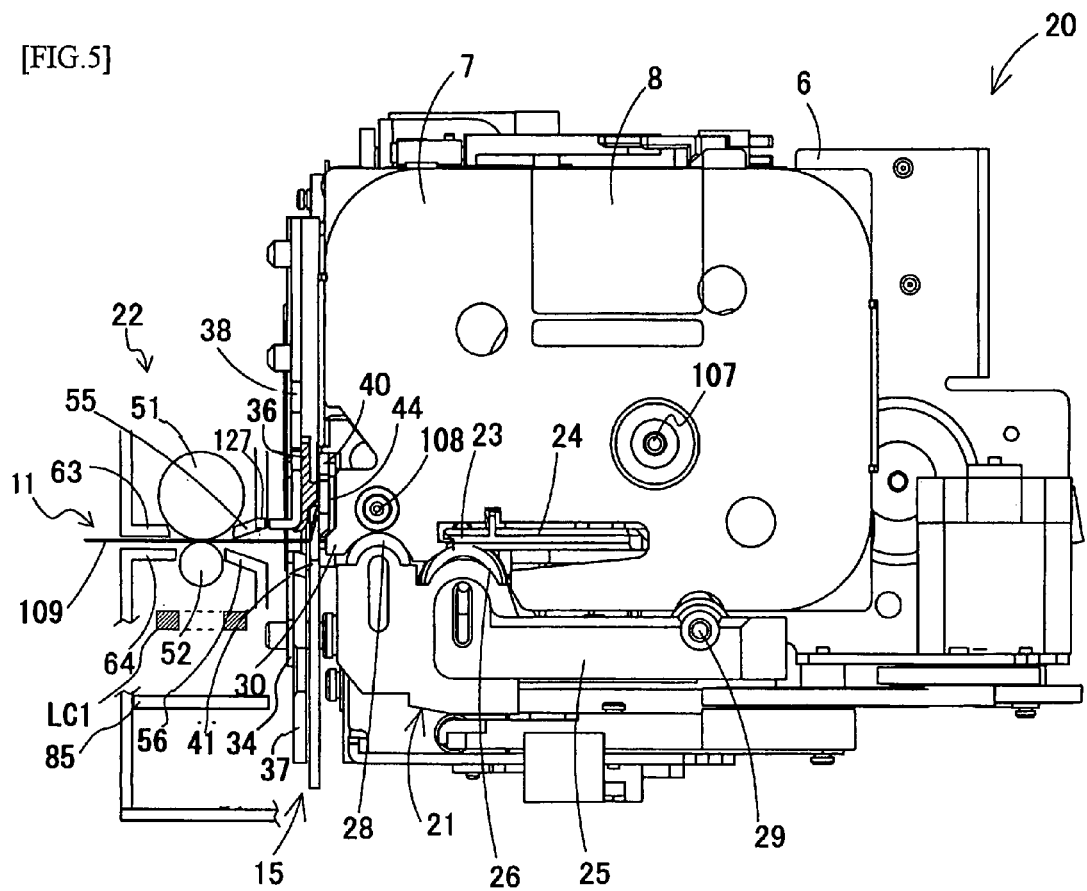

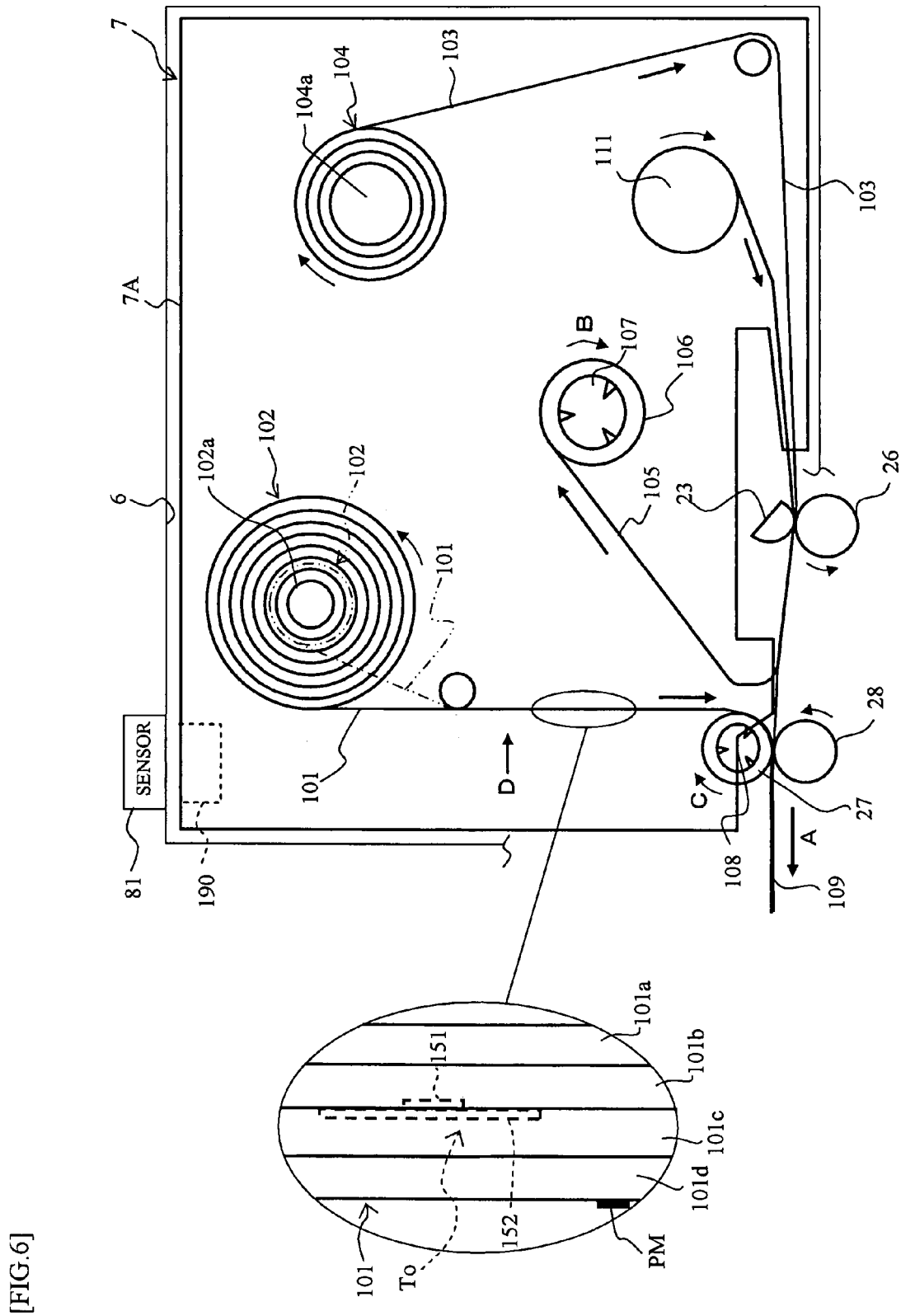

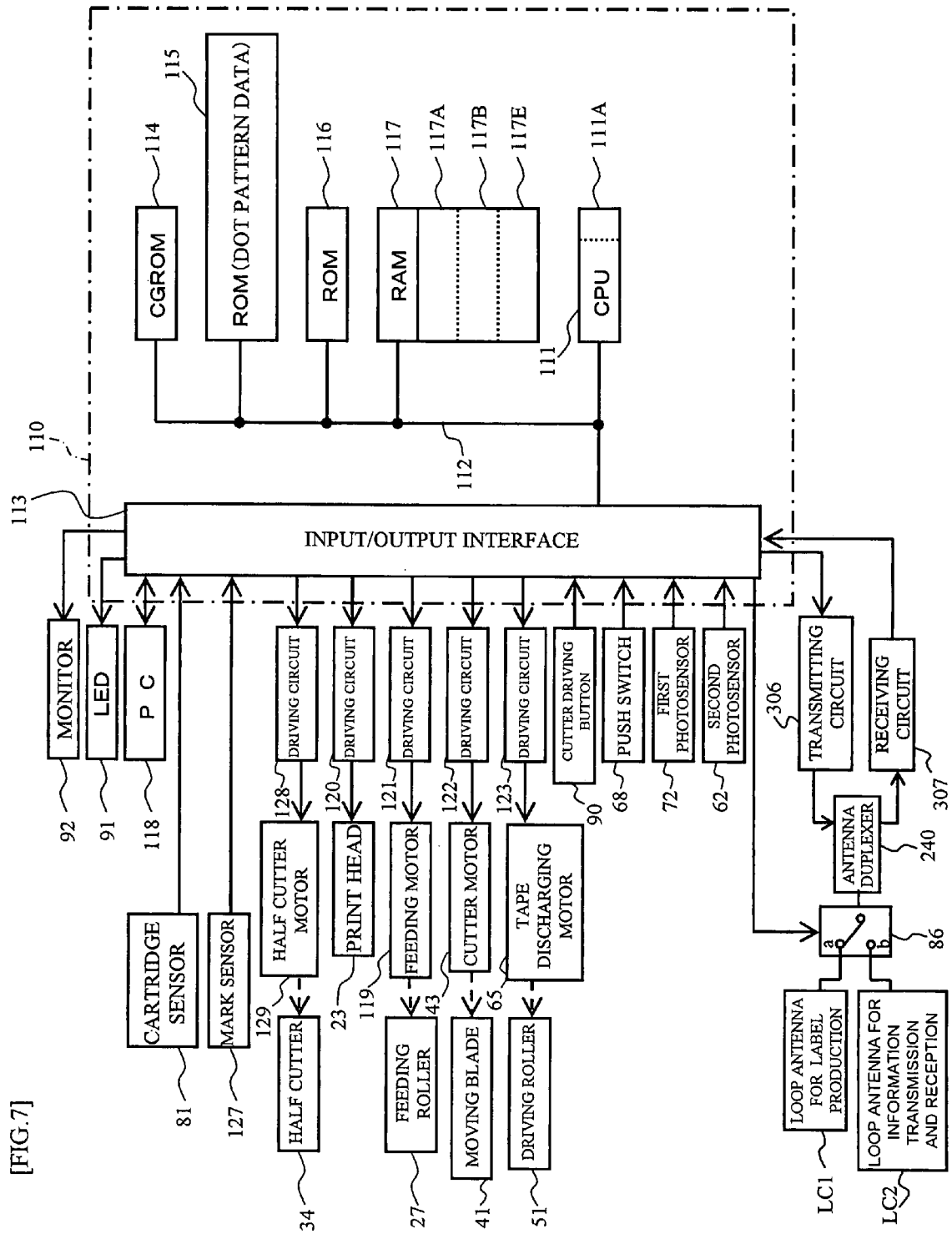
[FIG.7]

[FIG.8]
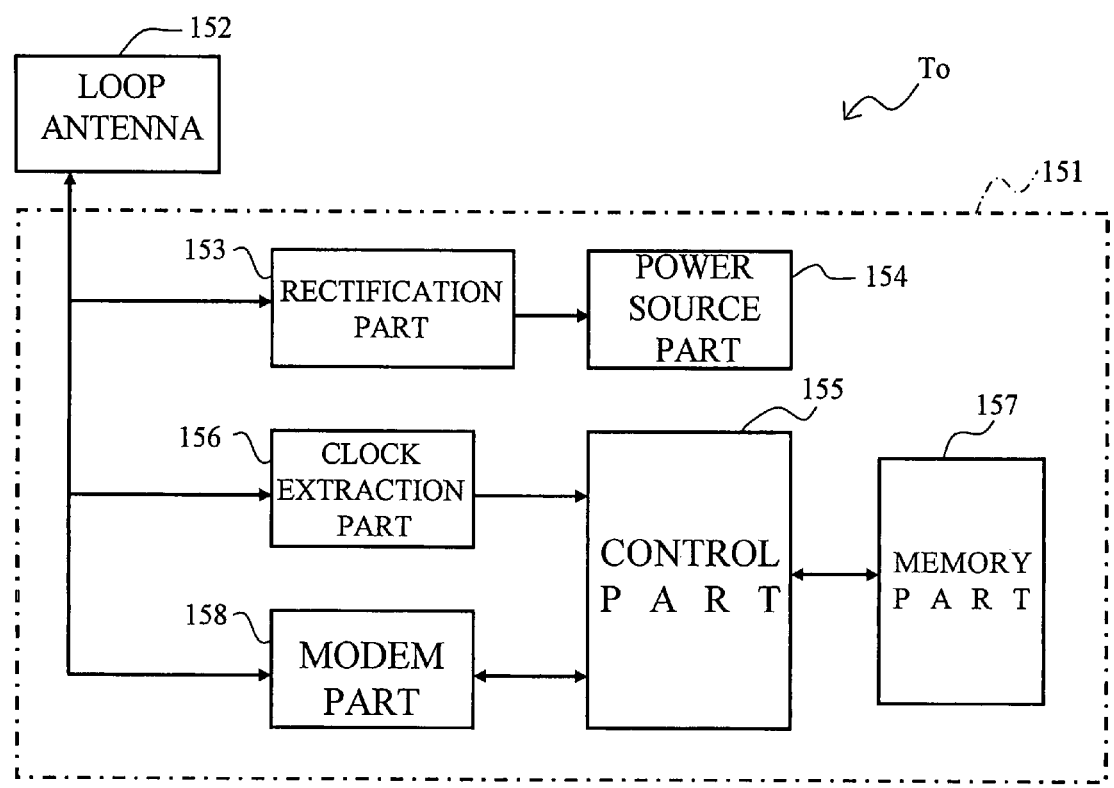

[FIG.9A]
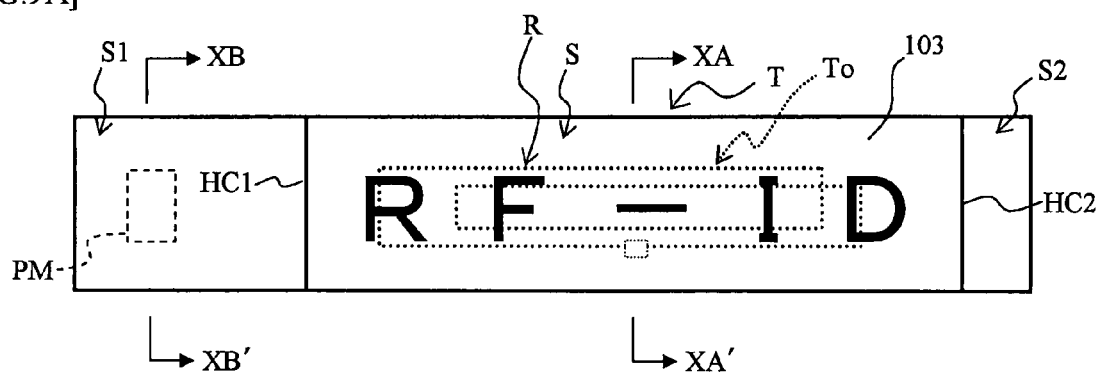
[FIG.9B]
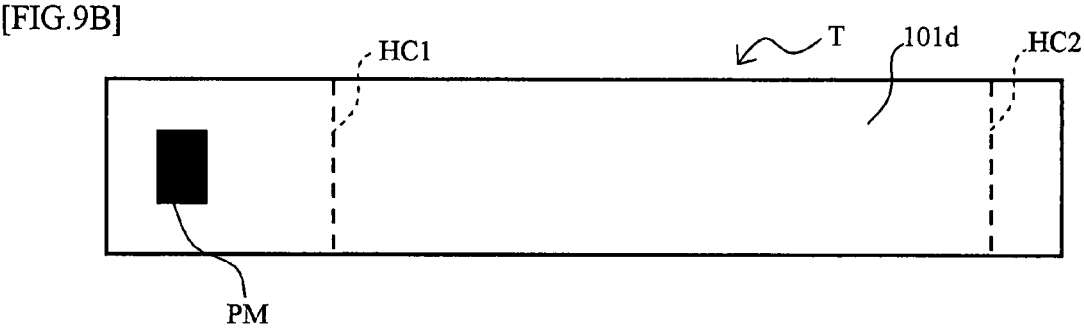

[FIG.10A]
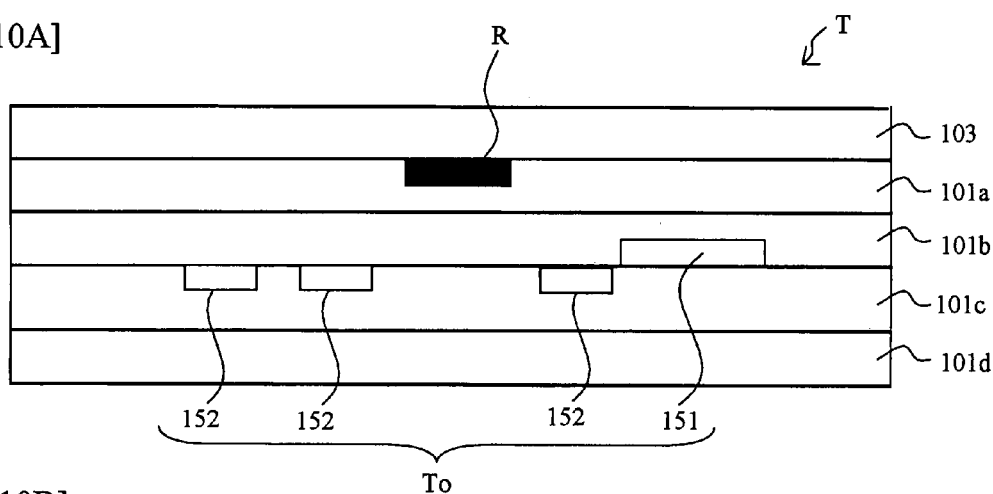
[FIG.10B]
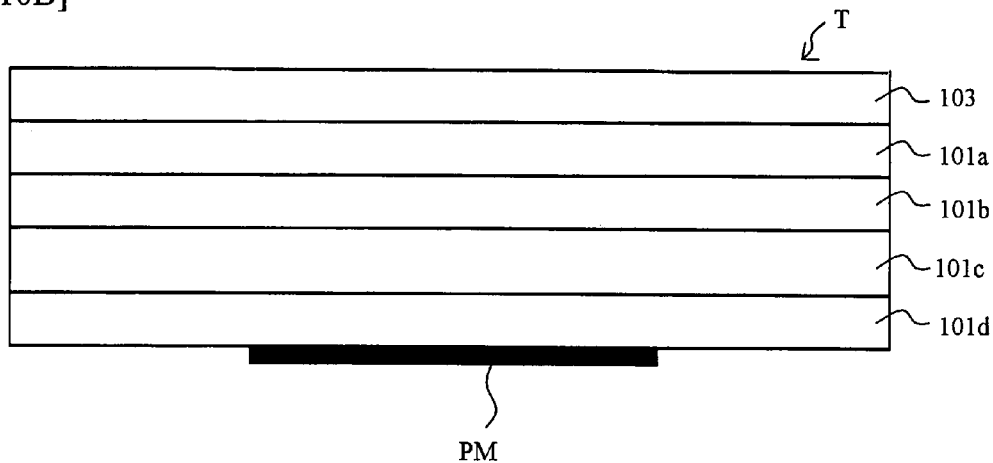

[FIG.11]
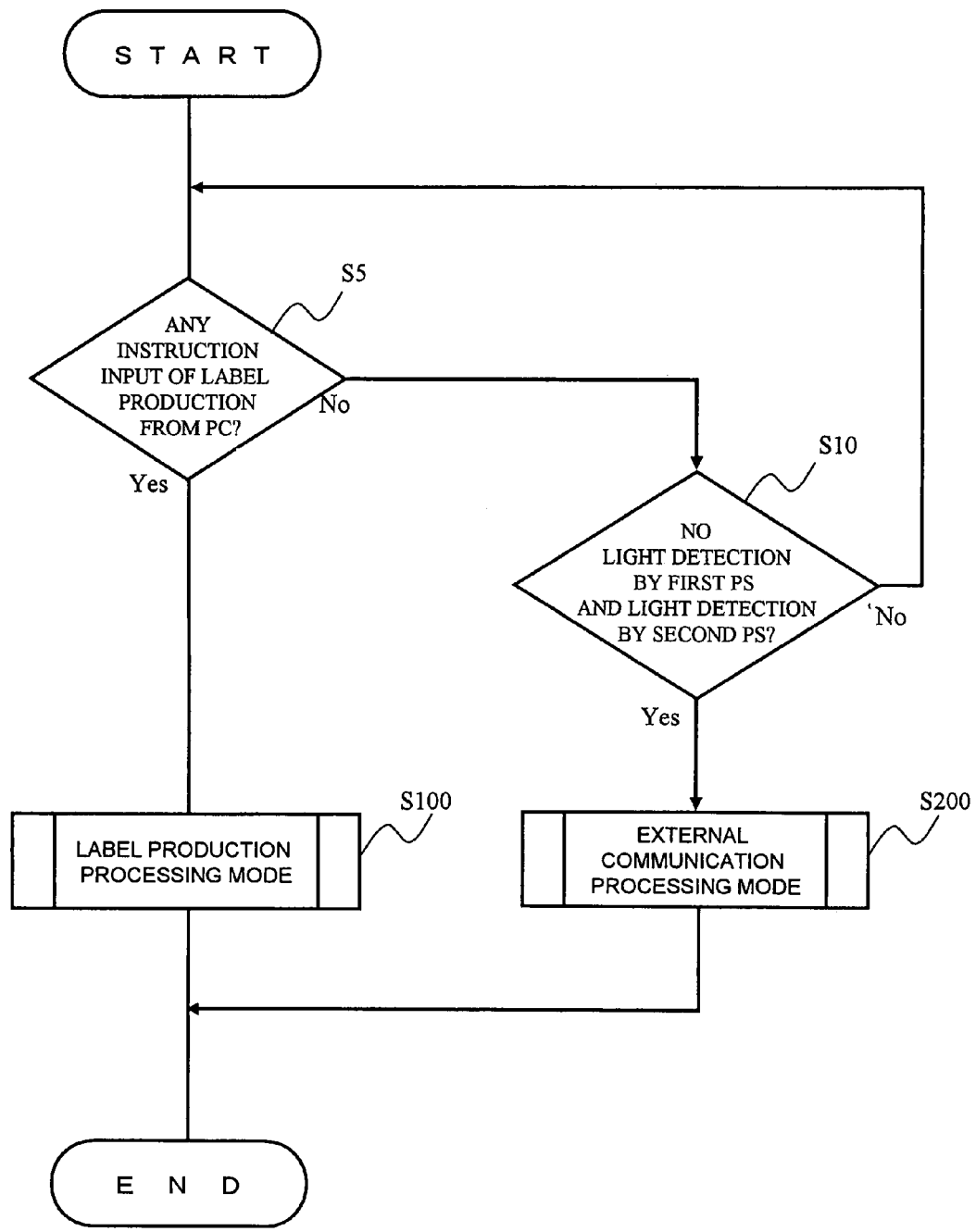

[FIG.12]
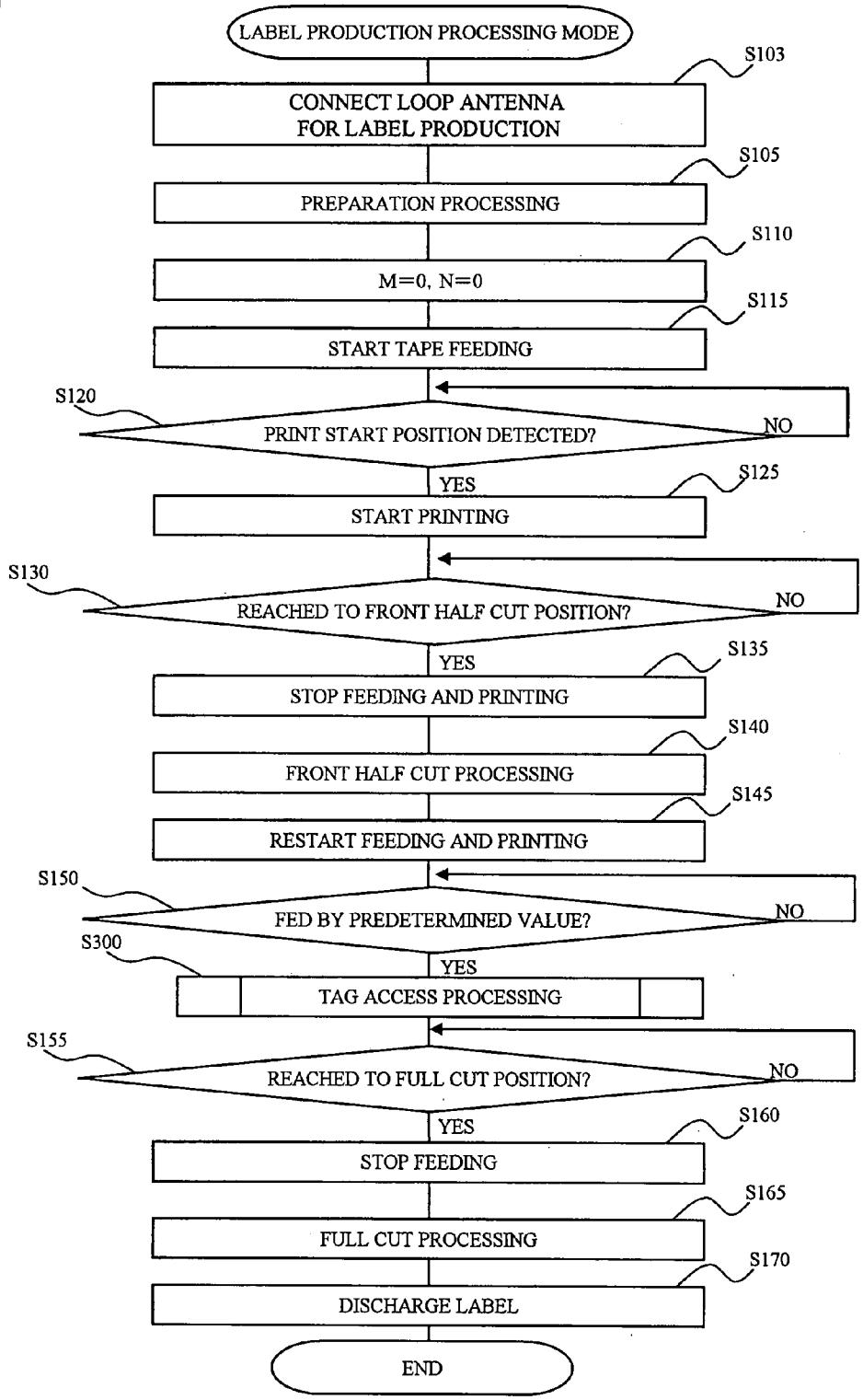

[FIG.13]
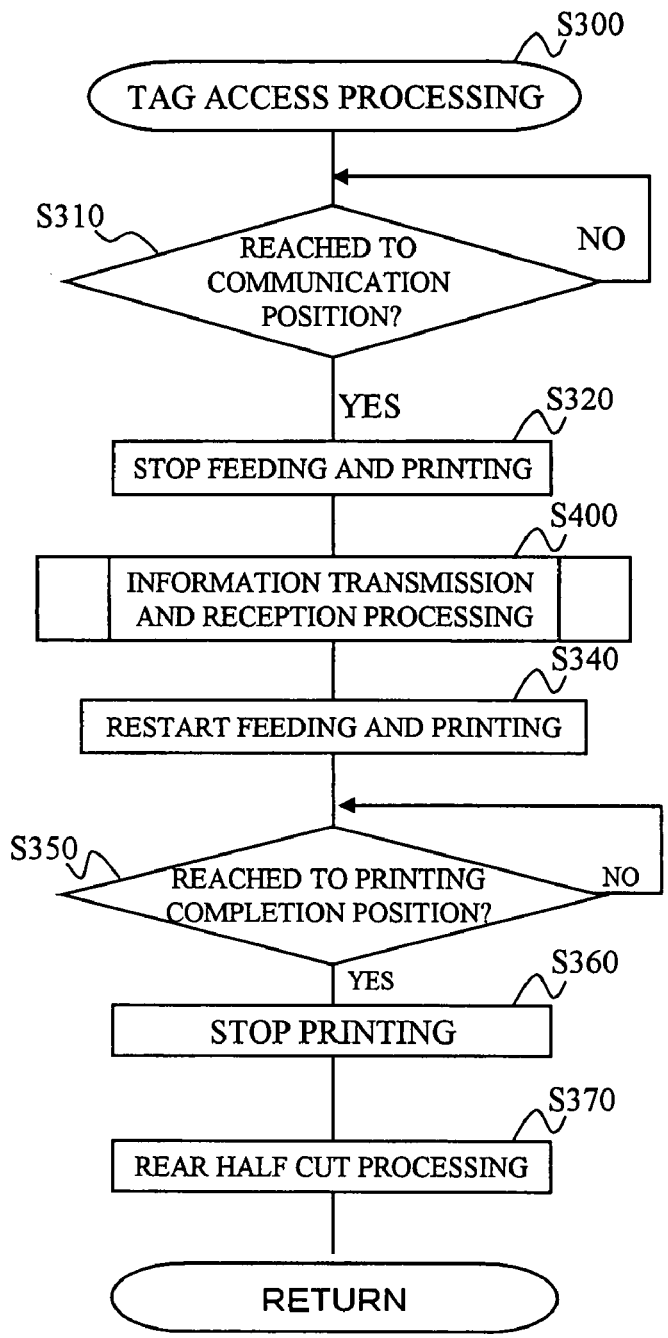

[FIG.14]
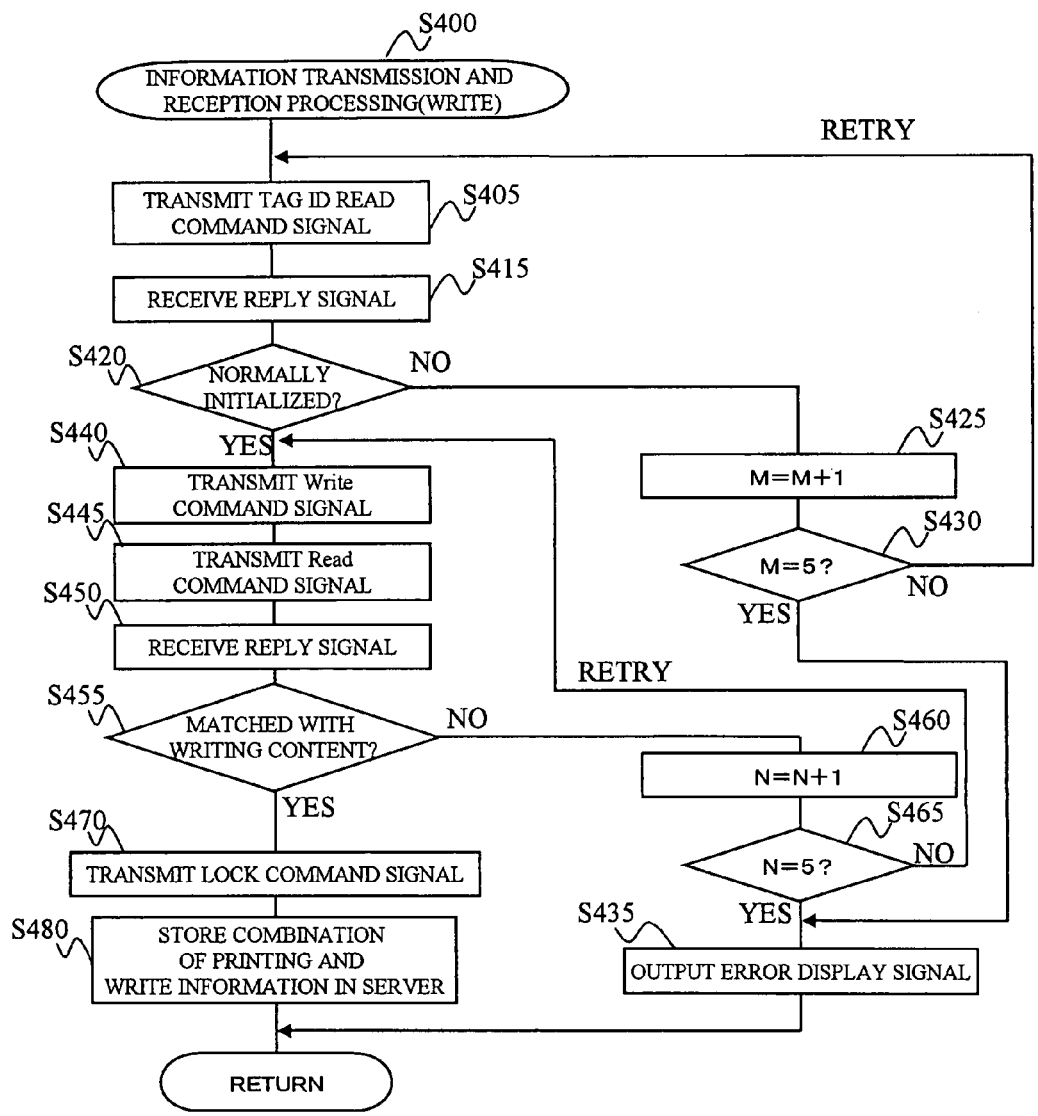

[FIG.15]
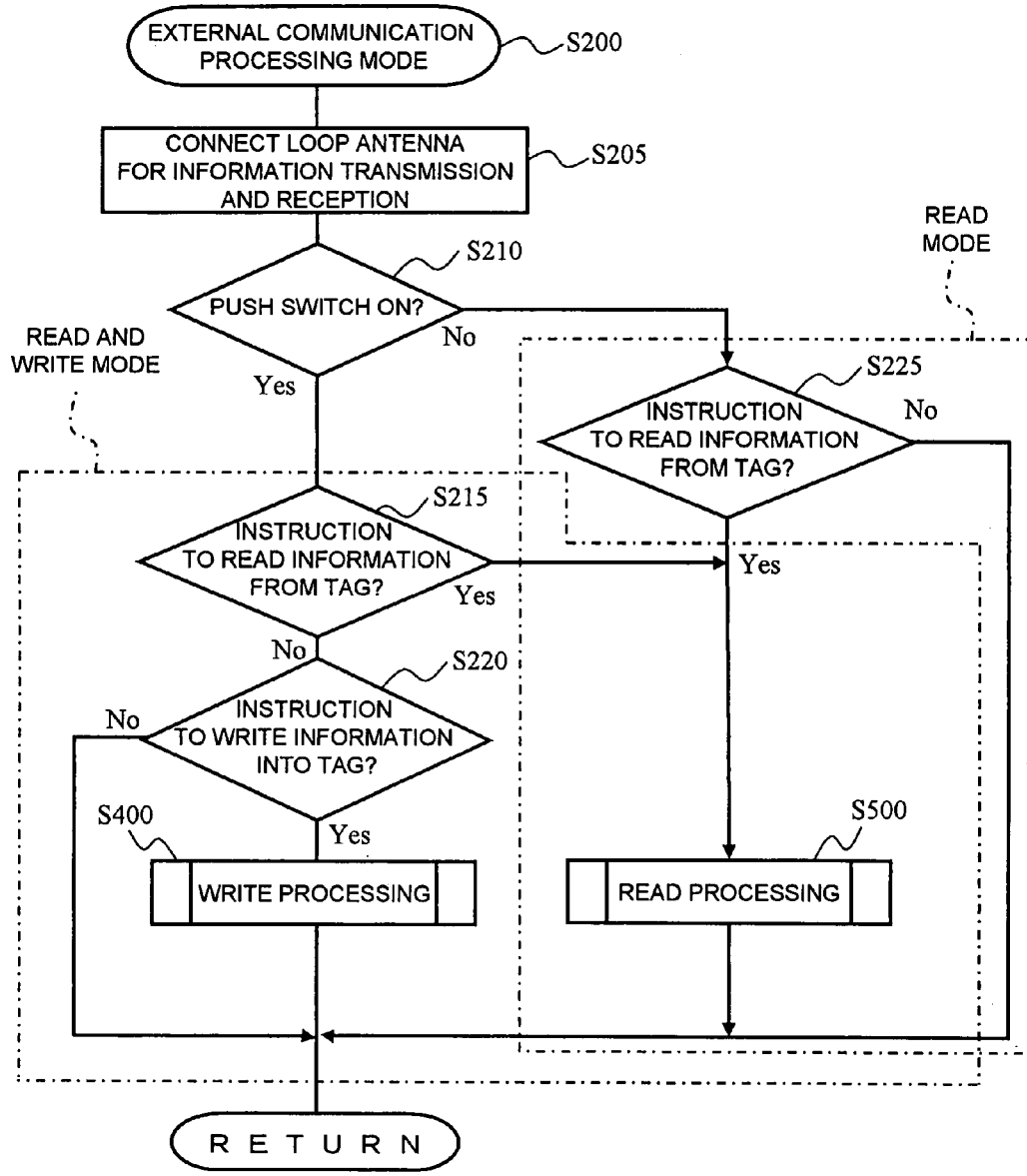

[FIG.16]
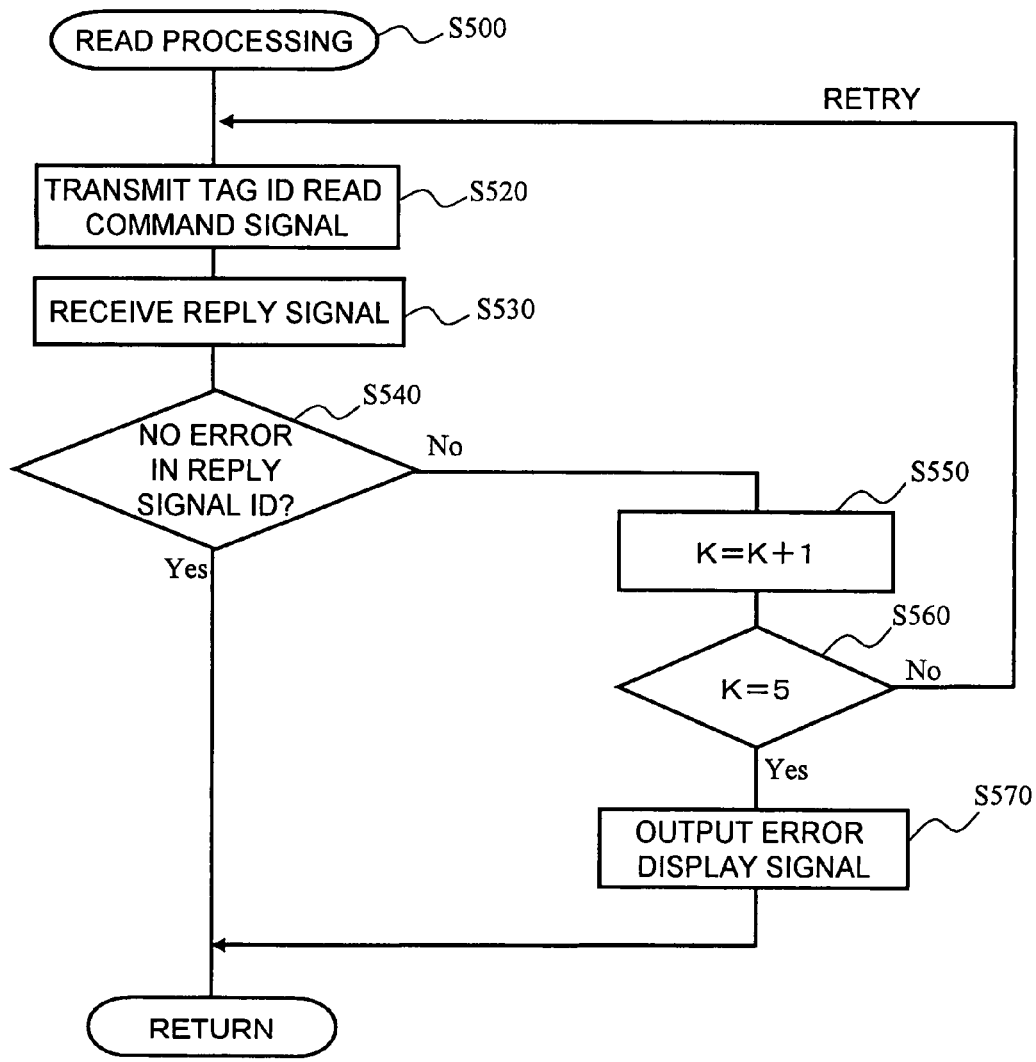

[FIG.17]
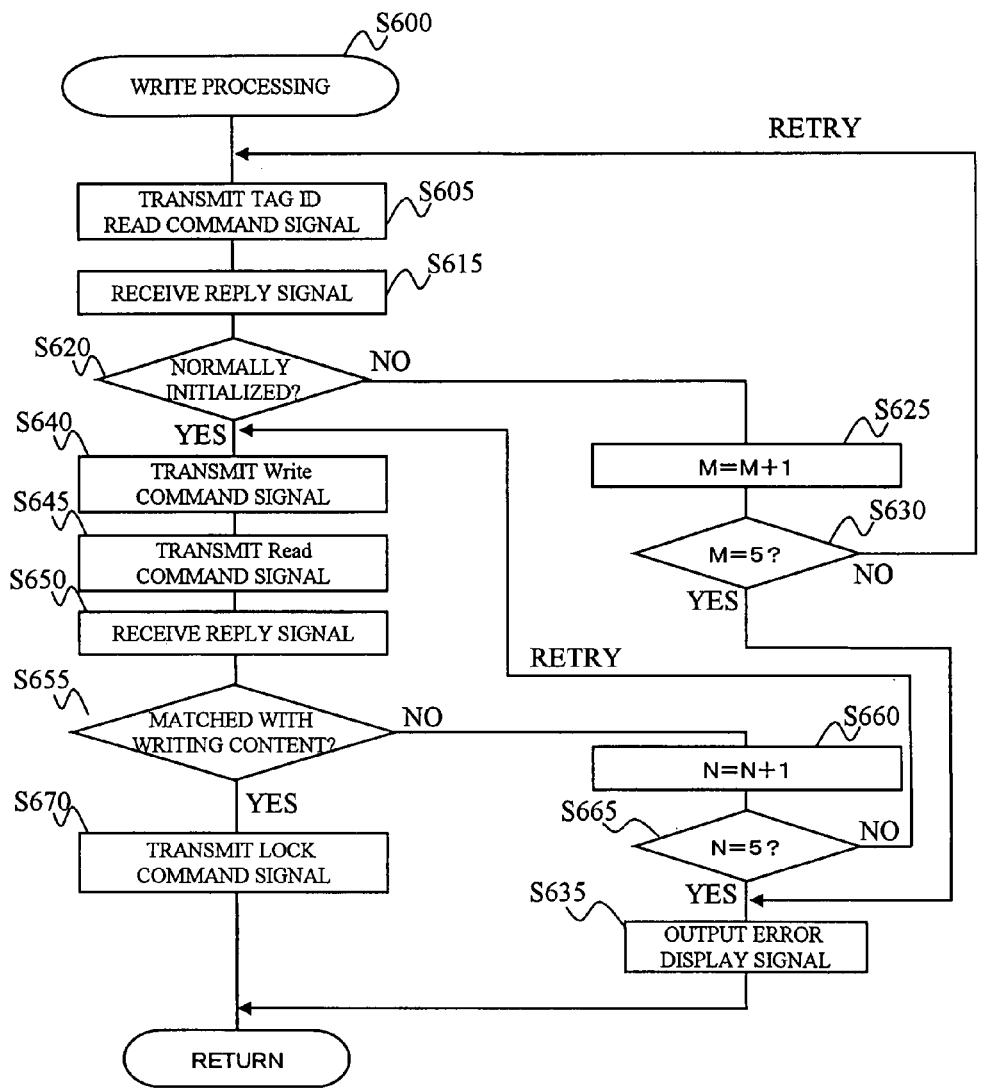

[FIG.18A]
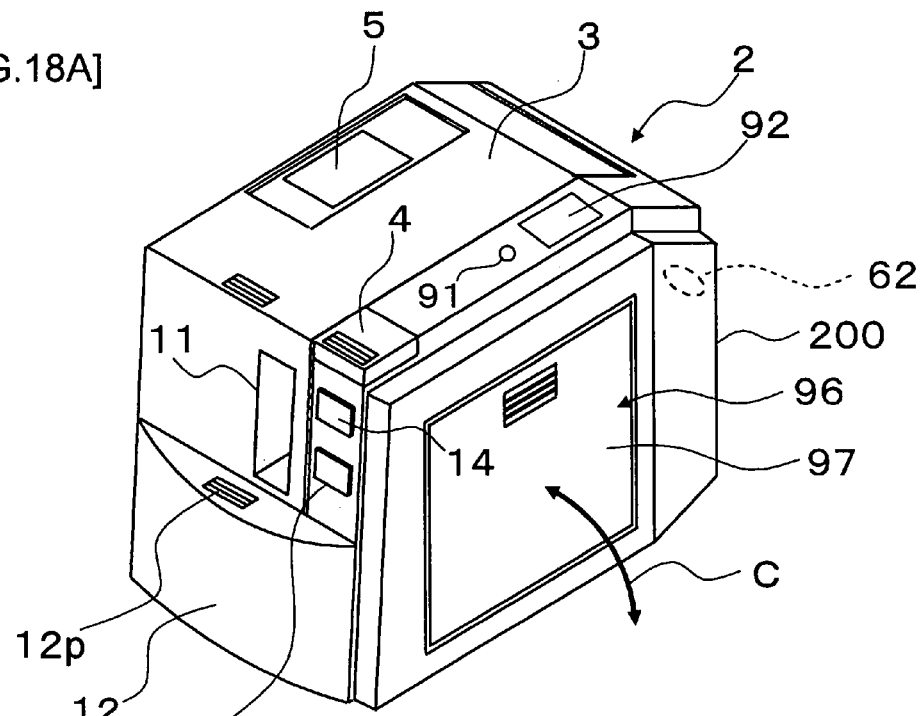
[FIG.18B]
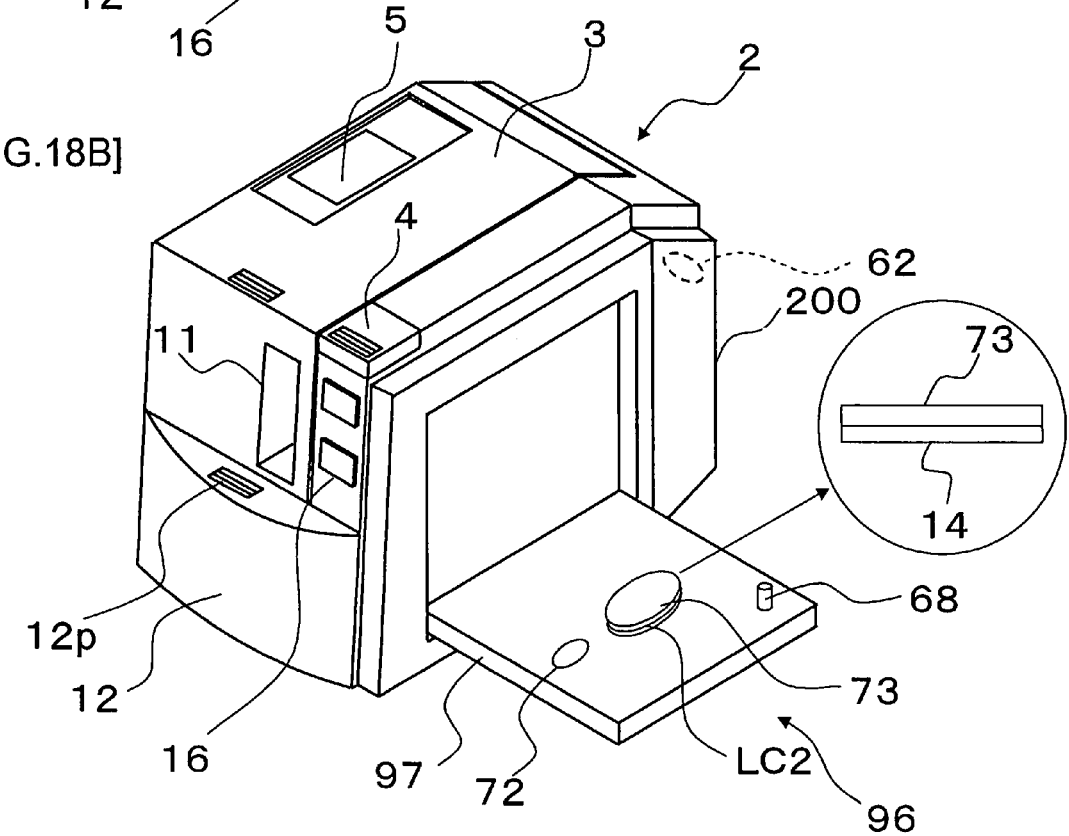

RFID TAG INFORMATION COMMUNICATING APPARATUS

CROSS-REFERENCE TO RELATED APPLICATIONS

This application claims priority from JP 2006-320635, filed Nov. 28, 2006, JP 2007-36952, filed Feb. 16, 2007, and JP 2007-254053, filed Sep. 28, 2007, the contents of which are hereby incorporated by reference.

BACKGROUND

1. Field

The present disclosure relates to an RFID tag information communicating apparatus for transmitting and receiving information via wireless communication with RFID circuit elements including an IC circuit part for storing information and a tag antenna.

2. Description of the Related Art

RFID (Radio Frequency Identification) systems are known, which performs information reading and writing contactlessly between a small-sized RFID tag and a reader (reading device)/writer (writing device). For example, an RFID circuit element, which is included in a label-shaped RFID tag, has an IC circuit part which stores predetermined RFID tag information and an antenna connected to the IC circuit part through which information is transmitted and received. Even when the RFID tag is dirty or disposed at an invisible position, the RFID tag information stored on the IC circuit part is accessible (reading/writing of information) from the reader/writer side. Accordingly, the RFID systems have been put into practical use in a various fields such as product control and/or inspection process.

For example, an RFID tag information communicating apparatus (storing device) disclosed in Patent Document 1 (JP, A, 2004-82432), which performs information writing onto such an RFID circuit element, is known. The prior art is configured as described below. That is, a strip shaped tag tape (base paper), to which rectangular label pieces (labels) are affixed at predetermined intervals, is fed out from a tag tape roll (roll paper). While the tag tape is fed through a feeding path, predetermined RFID tag information, which is generated by the apparatus, is transmitted to an antenna of an RFID circuit element included in each label piece. The information is written sequentially into an IC circuit part (IC chip) connected to the antenna, and print information corresponding to the written RFID tag information is printed on the surface of the RFID label by a printing means (recording head), thus completing an RFID label.

Generally, an RFID label produced by writing RFID tag information therein and applying related print thereon by the RFID tag information communicating apparatus (writing device) of prior art, is provided onto an object (article or the like) to be managed by affixing or other method. A reader (reading device) reads the RFID tag information from the RFID label provided onto the article or the like, thereby the information about the article is obtained, and thus the articles are managed. To produce RFID labels and actually manage articles by using them, a system having functions both of a reader and a writer is required. However, the conventional writer does not have the function as a reader, or even when provided with the function, the function as a reader is configured to perform communication only with a tag for writing, and the function as the reader cannot be applied for managing articles or the like. Therefore, another RFID tag information communicating apparatus, which functions as the reader, is required. As a result, a cost burden on a user was large.

SUMMARY

An object of the present disclosure is to provide an RFID tag information communicating apparatus capable of simplifying equipment configuration and reducing cost burden on a user by enabling information transmission and reception with RFID circuit elements in and outside the apparatus.

In order to achieve the above object, a first aspect of the application is an RFID tag information communicating apparatus, comprising: a feeding device disposed in a housing constituting a shell of an apparatus main body that feeds a label medium including a tag medium; an apparatus antenna device that is capable of transmitting/receiving information with a first RFID circuit element provided at the tag medium and a second RFID circuit element located outside the housing, each of the RFID circuit elements being provided with an IC circuit part storing information and a tag antenna transmitting and receiving information; and a read/write control portion that is capable of performing both of information reading and information writing with the first RFID circuit element as well as performing both of information reading and information writing with the second RFID circuit element via the apparatus antenna device.

In the first aspect of the present application, the apparatus can perform the tag label producing process and the external communication process using the apparatus antenna device. That is, when the tag label producing process is performed, the feeding device feeds out the label medium including the tag medium with the first RFID circuit element. Then, the read/write control portion performs information transmission and reception with the first RFID circuit element via the apparatus antenna device, and the RFID label is produced using the tag medium, which has the first RFID circuit element on which the read/write has been completed. On the other hand, upon execution of the external communication process, the read/write control portion performs information transmission and reception with the second RFID circuit element, which is located outside the housing, via the apparatus antenna device to read predetermined RFID tag information (or, to write predetermined RFID tag information). Thus, while sharing the antenna device and the read/write control part, both of the production processing of the RFID label within the housing and the communication processing with the RFID circuit element outside the housing can be performed. As a result, compared to the case where both of the label producing apparatus and the RFID tag information communicating apparatus are separately required, the equipment configuration can be simplified and the cost burden on the user can be reduced.

In order to achieve the above object, a second aspect of the present application is an RFID tag information communicating apparatus, comprising: a feeding device disposed in a housing constituting a shell of an apparatus main body that feeds a label medium including a tag medium; an apparatus antenna device that is capable of transmitting/receiving information with a first RFID circuit element provided at the tag medium and a second RFID circuit element located outside the housing, each of the RFID circuit elements being provided with an IC circuit part storing information and a tag antenna transmitting and receiving information; and a read/write controller that is capable of performing both of information reading and information writing with the first RFID circuit element as well as performing both of information reading and information writing with the second RFID circuit element via the apparatus antenna device.

In the second aspect of the present application, the apparatus can perform the tag label producing process and the external communication process using the apparatus antenna device. That is, when the tag label producing process is performed, the feeding device feeds out the label medium including the tag medium with the first RFID circuit element. Then, the read/write controller performs information transmission and reception with the first RFID circuit element via the apparatus antenna device, and the RFID label is produced using the tag medium, which has the first RFID circuit element on which the read/write has been completed. On the other hand, upon execution of the external communication process, the read/write controller performs information transmission and reception with the second RFID circuit element, which is located outside the housing, via the apparatus antenna device to read predetermined RFID tag information (or, to write predetermined RFID tag information). Thus, while sharing the antenna device and the read/write control part, both of the production processing of the RFID label within the housing and the communication processing with the RFID circuit element outside the housing can be performed. As a result, compared to the case where both of the label producing apparatus and the RFID tag information communicating apparatus are separately required, the equipment configuration can be simplified and the cost burden on the user can be reduced.

BRIEF DESCRIPTION OF THE DRAWINGS

FIG. 1 is a system configuration diagram showing an RFID tag manufacturing system including an RFID tag information communicating apparatus according to an embodiment of the disclosure.

FIG. 2 is a perspective view showing the external constitution of the RFID tag information communicating apparatus.

FIG. 3 is a view of the RFID tag information communicating apparatus of FIG. 2 when the main body is placed in a horizontal position.

FIG. 4 is a perspective view showing the structure of internal units within the RFID tag information communicating apparatus.

FIG. 5 is a plan view showing the structure of the internal units shown in FIG. 4.

FIG. 6 is an enlarged plan view schematically showing the detailed structure of a cartridge.

FIG. 7 is a functional block diagram showing a control system of the RFID tag information communicating apparatus.

FIG. 8 is a functional block diagram showing the functional configuration of an RFID circuit element for label production or for information transmission and reception.

FIGS. 9A and 9B are external views, respectively showing an upper face and bottom face of an example of an RFID label.

FIG. 10A is a cross-sectional view of FIG. 9A taken along the line XA-XA', which is rotated by 90° in a counterclockwise direction; and FIG. 10B is a cross-sectional view thereof taken along the line XB-XB', which is rotated by 90° in a counterclockwise direction.

FIG. 11 is a flowchart showing control procedure executed by a control circuit.

FIG. 12 is a flowchart showing detailed procedure executed at step S100: label producing process mode.

FIG. 13 is a flowchart showing detailed procedure of step S300: tag access processing.

FIG. 14 is a flowchart showing detailed procedure of step S400.

FIG. 15 is a flowchart showing detailed procedure of a processing executed at step S200: external communication process mode.

FIG. 16 is a flowchart showing detailed procedure of read processing at step S500 in FIG. 15.

FIG. 17 is a flowchart showing detailed procedure of write processing at step S600 in FIG. 15.

FIG. 18 is a perspective view showing an external constitution of a modified RFID tag information communicating apparatus that performs mode switching according to a position change of a part of the apparatus main body.

DETAILED DESCRIPTION OF THE PREFERRED EMBODIMENTS

An embodiment of the present disclosure will be described below with reference to the drawings. The present embodiment is an embodiment of the disclosure applied to an RFID label manufacturing system.

FIG. 1 shows an RFID tag manufacturing system TS provided with an RFID tag information communicating apparatus 1 according to the embodiment.

In the RFID tag manufacturing system TS shown in FIG. 1, the RFID tag information communicating apparatuses 1 is connected to a route server RS, a plurality of information servers IS, a terminal 118a and a general purpose computer 118b through a wired or wireless communication line NW. It should be noted that the terminal 118a and general purpose computer 118b will be hereinafter simply collectively referred to as "PC 118" for convenience.

FIG. 2 shows the external constitution of the RFID tag information communicating apparatus 1. Based on an operation on the PC 118, the RFID tag information communicating apparatus 1 performs tag label producing process (which will be described later in detail) within the apparatus using a base tape 101 (which will be described later in detail) that includes an RFID circuit element To for label production, and also performs external communication process (which will be described later in detail) with an RFID circuit element To for information transmission and reception, which is located outside the apparatus. Corresponding to the above processes, the RFID tag information communicating apparatus 1 has three process modes; i.e., a label producing process mode for performing the tag label producing process, an external communication process mode for performing external communication process, and a standby mode that is neither the label producing process mode nor the external communication process mode (detailed description of each mode will be given later).

Referring to FIG. 2, the RFID tag information communicating apparatus 1 includes an apparatus main body 2 and a cartridge 7 mounted on a cartridge holder 6 of the apparatus main body 2 (refer to FIG. 4 to be described later). The apparatus main body 2 has a generally rectangular solid-shaped housing 200 as its shell (top face part, bottom face part, front face part, rear face part, and right and left side face parts). The top face part is provided with an open/close cover 3, a cover open/close button 4, a direction mark Y, an LED 91, and a monitor 92. The front face part is provided with a label discharging port 11, a front cover 12, a power button 14, and a cutter driving button 16. One of the side face parts (right side in the embodiment) is provided with a communication part 61 for information transmission and reception (hereinafter, referred to as communication part 61). The rear face part is provided with a second photo sensor 62 (indicated with a broken line for illustrating purpose). The other side face part (left side in the embodiment) is provided with a push switch 68 and support pads 69 (refer to FIG. 3).

The open/close cover 3 is rotatably supported at the end of the apparatus main body 2 in right back side of FIG. 2, and is arranged to be energized in an opening direction by an energizing member (not shown) and to be lockable to the apparatus main body 2. Also, the open/close cover 3 is arranged so that, when the cover open/close button 4 is depressed to release the lock, the open/close cover 3 is opened by an energizing action of the energizing member, and thus the cartridge 7 can be mounted and dismounted. The open/close cover 3 is provided with a see-through window 5 fitted with a transparent cover or the like.

The direction mark Y indicates a direction of the side face part where the communication part 61 is provided (i.e., installation location of an antenna LC2 for information transmission and reception (herein after, referred to as antenna LC2); which is described later). With the direction mark Y, an operator easily recognizes the direction of the communication part 61 (i.e., the installation location of the antenna LC2).

The LED 91 is an indicator to notify the operator that the process mode is switched to the external communication process mode. In particular, when switched to the external communication process mode, the LED 91 flashes or lights up. With the arrangement, the operator can reliably recognize visually the operational state of the apparatus. In addition to or in place of the LED 91, a means for giving a notification by sound output such as beep tone or buzzer sound (speaker or the like) may be provided.

The monitor 92 is a display for giving a notification (read information writing information) to the operator corresponding to the processing result of the external communication process mode. By providing the monitor 92, the operator can reliably recognize the processing result or the like of the external communication process visually. Also, the result can be displayed only by the RFID tag information communicating apparatus 1 and another display device is not needed. In the case where only the information of transmission/reception success or failure is notified as the result of the external communication process, an LED may be provided in place of the monitor. In this case, the LED 91 that indicates the operation status may be commonly used as an indicator that indicates the processing result by means of a color or flashing intervals or the like of the LED. Alternately, a means that notifies the processing result by emitting a sound (like a speaker) may be provided.

The label discharging port 11 discharges an RFID label T produced within the apparatus main body 2. The front cover 12 is arranged to open and close by rotating around the lower end thereof. When a press part 12p provided on the upper part of the front cover 12 is pressed down, the front cover 12 rotates forward and opens. The power button 14 is used to turn on and OFF the main power supply of the RFID tag information communicating apparatus 1. The cutter driving button 16 is provided so that the operator operates a cutting mechanism 15 provided within the apparatus main body 2 (refer to FIG. 4 and FIG. 5) in a manual mode. When the button 16 is pressed, the tag label tape 109 with print (refer to FIG. 5 and FIG. 6) is cut to a desired length, and thus the RFID label T is produced.

The communication part 61 includes, on the side face part of the apparatus main body 2, a protrusion 70 formed so as to protrude at an appropriate height higher than the surrounding portion, the antenna LC2 that performs wireless communication of information with an RFID circuit element To for information transmission and reception (described later in detail, refer to FIG. 8), which is provided to the protrusion 70 outside the housing 200, and a first photo sensor 72 disposed on the protrusion 70.

In this embodiment, each of the first photo sensor 72 and the second photo sensor 62 outputs a corresponding light-shielding detection signal upon shielding of the light.

For example, a loop antenna is used for the antenna LC2. By disposing the antenna LC2 on the protrusion 70, the position of the antenna LC2 can be easily recognized by the operator; and thus, the usability of the apparatus is enhanced. The antenna LC2 is covered and protected with a shock absorber 73. With the arrangement, in order to hold up an object attached with the RFID circuit element To for information transmission and reception to the antenna LC2, even when the object is brought too close to the antenna LC2, the antenna LC2 can be reliably prevented from coming into direct contact with the object and prevented from a shock caused therefrom.

FIG. 3 shows the apparatus main body of the RFID tag information communicating apparatus in FIG. 2, which is placed in a horizontal position (the left side face in FIG. 2 is positioned at the bottom side, and the right side face is positioned at the upper side).

The RFID label may be produced by an apparatus other than the RFID tag information communicating apparatus 1 and the configuration thereof is not limited to a label-like configuration but may have a card-like configuration. When the RFID label Tu attached to, for example, an article M is held up to a position near the antenna LC2 as shown in FIG. 3, the antenna LC2 communicates with the RFID circuit element To included in the RFID label Tu. With the arrangement, the information stored in the RFID circuit element To can be read and desired information can be written onto the RFID circuit element To (which will be described later in detail). At this time, when the RFID label Tu is held up to the antenna LC2 in order to read or write the information, even when the article M accidentally hits the antenna LC2, the shock absorbing function of the shock absorber 73 prevents a strong shock from being applied to the antenna LC2.

The push switch 68 is a switchable mechanical switch. When the RFID tag information communicating apparatus 1 is placed in a horizontal position (supported by a support face F via support pads 69) so that the communication part 61 comes at the upper side as shown in FIG. 3, the push switch 68 is pressed by the support face F as shown in FIG. 3, and the switch is turned ON. In this state, for example, when the RFID label Tu is appropriately held up to the antenna LC2 by the operator, the light quantity entering the first photo sensor 72 is reduced, and thus the light-shielding detection signal is output as an ON signal.

FIG. 4 shows the structure of an internal unit 20 within the RFID tag information communicating apparatus 1 (antenna LC1, which will be described later, is omitted). Referring to FIG. 4, the internal unit 20 generally includes the cartridge holder 6 for receiving the cartridge 7, a printing mechanism 21 having a print head (thermal head) 23, the cutting mechanism 15 having a fixed blade 40 and a movable blade 41, and a half cut unit 35, which is positioned at the downstream side of the fixed blade 40 and movable blade 41 in a tape transport direction, and provided with a half cutter 34.

The cartridge 7 is provided, in the upper face thereof, with a tape identification display part 8 for displaying, for example, a width, color or the like of the base tape 101 included within the cartridge 7. On the cartridge holder 6, a roller holder 25 is pivoted rotatably by a support shaft 29 to switch to a printing position (contact position, refer to FIG. 5) and a release position (separation position) by a switching mechanism. On the roller holder 25, the platen roller 26 and the pressure roller 28 are rotatably disposed and arranged so that, when the roller holder 25 is switched to the printing position, the platen roller 26 and pressure roller 28 are pressed onto the print head 23 and feeding roller 27.

The print head 23 is provided with many heating elements and is attached to a head attachment 24 vertically provided to the cartridge holder 6.

The cutting mechanism 15 includes the fixed blade 40 and a movable blade 41 made of a metal member. The driving force of a cutter motor 43 (refer to FIG. 7) is transmitted to a lever part 46 of the movable blade 41 via a cutter helical gear 42, a boss 50 and an elongate hole 49. Thus the movable blade is driven to rotate to perform the cutting operation along with the fixed blade 40. The cutting operation is detected by a micro switch 126 which is switched by the action of a cam 42A on the cutter helical gear.

The half cut unit 35 is configured such that a receiver 38 and the half cutter 34, which are disposed facing each other, and a first guide part 36 and a second guide part 37 are attached to a side plate 44 (refer to FIG. 5) with guide fixing parts 36A, and the half cutter 34 is driven to rotate by the driving force of the half cutter motor 129 (refer to FIG. 7) about a predetermined rotation center (not shown). In the end portion of the receiver 38, a receiving face 38B is formed.

FIG. 5 shows the structure of the internal unit 20 shown in FIG. 4. Referring FIG. 5, the cartridge holder 6 receives the cartridge 7 so that the width direction of the tag label tape 109 with print, which is discharged through a tape discharging part 30 of the cartridge 7 and further, through the label discharging port 11, orients to the vertical direction.

The internal unit 20 further includes a label discharging mechanism 22 and the antenna LC1.

The antenna LC1 has a communicable zone inside the housing 200 and is adapted so as to perform communication with the RFID circuit element To for label production provided to the tag label tape 109 with print. The antenna LC2 has a communicable zone outside the housing 200, and is adapted so as to perform communication with the RFID circuit element To for information transmission and reception, which is located outside the housing 200. Therefore, in order to shield the magnetic flux generated from the antenna LC1, the inside of the housing 200 is provided with, for example, a shielding member 85 made of metal.

The label discharging mechanism 22 discharges the tag label tape 109 with print (hereinafter, referred to as RFID label T), which has been cut by the cutting mechanism 15, through the label discharging port 11 (refer to FIG. 2). The label discharging mechanism 22 includes a driving roller 51, which is driven to rotate by the driving force of a tape discharging motor 123 (refer to FIG. 7), a pressure roller 52 opposed to the driving roller 51 sandwiching the tag label tape 109 with print, and a mark sensor 127 that detects an ID mark PM (refer to FIG. 6) provided to the tag label tape 109 with print. Inside of the label discharging port 11, first guide walls 55 and 56 and second guide walls 63 and 64 for guiding the tag label tape 109 with print to the label discharging port 11 and the antenna LC1 are provided. The first guide walls 55 and 56 and the second guide walls 63 and 64 are integrally formed respectively, and are disposed separated from each other by a predetermined distance at the discharging position of the tag label tape 109 with print (RFID label T), which has been cut by the fixed blade 40 and the movable blade 41.

A feeding roller driving shaft 108 and a ribbon take-up roller driving shaft 107 impart a feed driving force respectively to the tag label tape 109 with print and the ink ribbon 105 (which will be described later), and are driven to rotate synchronously with each other.

FIG. 6 schematically shows the structure of the cartridge 7 in detail.

Referring to FIG. 6, the cartridge 7 includes a housing 7A, a first roll 102 disposed within the housing 7A being wound with a strip of base tape 101 (which is wound spirally actually, but is simply expressed in a concentrical shape in FIG. 6), a second roll 104 wound with a transparent cover film 103 having a width substantially identical to that of the base tape 101 (which is wound spirally actually, but is simply expressed in a concentrical shape in FIG. 6), a ribbon supply roll 111 that feeds out an ink ribbon 105 (thermal transfer ribbon; unnecessary when the print-receiving tape is a thermal tape), a ribbon take-up roller 106 for winding the ribbon 105 after printing, and a feeding roller 27 rotatably supported adjacent to the tape discharging part 30 of the cartridge 7. The base tape 101 and the cover film 103, which is bonded to the base tape 101 constitute the label medium.

The feeding roller 27 presses to adhere the cover film 103 onto the base tape 101 and thus forms the tag label tape 109 with print. The tapes are fed in a direction indicated with an arrow A in FIG. 6 (i.e., the feeding roller 27 also functions as a pressure roller).

The first roll 102 includes the base tape 101 wound around a reel member 102a, in which a plurality of the RFID circuit elements To for label production is sequentially formed at predetermined intervals in a longitudinal direction. In this embodiment, the base tape 101 has a four-layered structure (refer to the enlarged view in FIG. 6). From the side which comes to the inner side (right side in FIG. 6) toward the opposite side (left side in FIG. 6), the base tape 101 is composed of an adhesive layer 101a of an appropriate adhesive, a colored base film 101b of PET (polyethylene terephthalate) or the like, an adhesive layer 101c, and a separation sheet (releasing material) 101d, which are laminated in this order.

In this embodiment, on the rear side of the base film 101b (left side in FIG. 6), a loop antenna 152 is formed integrally therewith in a loop coil shape for transmitting and receiving information. An IC circuit part 151 for storing the information is formed being connected to the loop antenna 152; thus the RFID circuit element To for label production is constituted.

On the front side of the base film 101b (right side in FIG. 6), the adhesive layer 101a for adhering the cover film 103 is formed. Also, on the rear side (left side in FIG. 6) of the base film 101b, the separation sheet 101d is bonded to the base film 101b via the adhesive layer 101c, which is formed so as to include the RFID circuit element To for label production.

When the RFID label T finished in a label shape is affixed to a predetermined article, the separation sheet 101d is arranged to be peeled off so that the RFID label T can be bonded on the article via the adhesive layer 101c. On the front face of the separation sheet 101d, a predetermined ID mark PM (in this embodiment, a black ID mark. The ID mark PM may be formed with holes penetrating through the base tape 101 processed by means of a laser processing or Thomson dies.) for controlling the feeding thereof is provided at a predetermined position corresponding to each of the RFID circuit element To for label production (in this embodiment, at a position in front of the front end of the loop antenna 152 in a transport direction).

The second roll 104 includes a reel member 104a with the cover film 103 wound thereon. When a ribbon 105 driven by the ribbon supply roll 111 and the ribbon take-up roller 106 disposed at the rear face side of the cover film 103 (i.e., the side to be bonded to the base tape 101) is pressed by the print head 23, the ribbon 105 is brought into contact with the rear face of the cover film 103 fed out from second roll 104.

A feeding motor 119 (refer to FIG. 4 and FIG. 7) as, for example, a pulse motor is disposed outside the cartridge 7. It is arranged so that a driving force of the feeding motor 119 is transmitted to the ribbon take up roller driving shaft 107 and the feeding roller driving shaft 108 via a gear mechanism (not shown), the ribbon take-up roller 106 and the feeding roller 27 are driven to rotate synchronously. The print head 23 is disposed at an upstream side of the cover film 103 in a transport direction than the feeding roller 27.

In the above-described constitution, the base tape 101, which is fed out from the first roll 102, is supplied to the feeding roller 27. On the other hand, the ink ribbon 105, which is disposed at the rear face of the cover film 103 (i.e., the side to be bonded with the base tape 101) and is driven by the ribbon supply roll 111 and the ribbon take-up roller 106, is pressed by the print head 23 to be brought into contact with the rear face side of the cover film 103 fed out from the second roll 104.

When the cartridge 7 is mounted onto the cartridge holder 6 and the roll holder 25 is moved from the release position to the printing position, the cover film 103 and the ink ribbon 105 are sandwiched between the print head 23 and the platen roller 26, and the base tape 101 and the cover film 103 are sandwiched between the feeding roller 27 and the pressure roller 28. The ribbon take-up roller 106 and the feeding roller 27 are driven to rotate synchronously by a driving force of the feeding motor 119 in a direction indicated with the arrows B and C in FIG. 6. The feeding roller driving shaft 108, the pressure roller 28 and the platen roller 26 are linked with one another with a gear mechanism (not shown). When the feeding roller driving shaft 108 is driven, the feeding roller 27, the pressure roller 28 and the platen roller 26 are driven to rotate. The base tape 101 is thus fed out from the first roll 102 and supplied to the feeding roller 27 as described above. On the other hand, the cover film 103 is fed out from the second roll 104 and a plurality of heating elements on the print head 23 is electrified via the print-head driving circuit 120 (refer to FIG. 7). As a result, the cover film 103 is printed, on the rear face thereof, with a print R corresponding to the RFID circuit element To for label production on the base tape 101 as the object to be bonded (refer to FIG. 9). The base tape 101 and the printed cover film 103 are bonded to each other by the feeding roller 27 and the pressure roller 28 to be integrated with each other and formed into a tag label tape 109 with print, and is fed out of the cartridge 7 through the tape discharging part 30 (refer to FIG. 5). The ink ribbon 105 after printing on the cover film 103 is wound by the ribbon take-up roller 106 which is driven by the ribbon take-up roller driving shaft 107.

At a position corresponding to the cartridge holder 6, a cartridge sensor 81 for detecting the mounted status of the cartridge 7 is disposed to detect apart 190 for detection provided on the cartridge 7. A detection signal form the cartridge sensor 81 is input to the control circuit 110 (refer to FIG. 7) to detect the kind of the cartridge when the cartridge 7 is mounted and dismounted.

After reading or writing the information on the RFID circuit element To for label production on the tag label tape 109 with print, which has been bonded and produced as described above, through the antenna LC1, the tag label tape 109 with print is cut off by the cutting mechanism 15; and thus the RFID label T is produced automatically or by operating the cutter driving button 16 (refer to FIG. 2). After that, the RFID label T is discharged from the label discharging port 11 (refer to FIG. 2) by the label discharging mechanism 22.

FIG. 7 shows a control system of the RFID tag information communicating apparatus 1 according to the embodiment. Referring to FIG. 7, a control circuit 110 is disposed on a control board (not shown) of the RFID tag information communicating apparatus 1.

The control circuit 110 includes a CPU 111 that controls the respective devices, an I/O interface 113 connected to the CPU 111 via a data bus 112, a CGROM 114, a ROM 115, a ROM 116, and a RAM 117.

The ROM 116 stores a print-head driving control program that, responding to an operation input signal from the PC 118, reads data in a printing buffer and driving the print head 23, the feeding motor 119 and a tape discharging motor 65; a cutting-driving control program that, upon a termination of printing, drives the feeding motor 119 to transport the tag label tape 109 with print to a cutting position, and drives the cutter motor 43 to cut the tag label tape 109 with print; a tape discharging program that drives the tape discharging motor 65 to forcibly discharging the cut tag label tape 109 with print (i.e., RFID label T) from the label discharging port 11; a transmission program that generates access information such as an interrogation signal or write signal to the RFID circuit element To for label production or for information transmission and reception and outputs the signal to a transmitting circuit 306 (which will be descried later); a receiving program that processes a reply signal or the like input from a receiving circuit 307 (which will be descried later); and various programs necessary for controlling the RFID tag information communicating apparatus 1. The CPU 111 performs various kinds of calculation based on the various programs stored in the ROM 116 listed above.

The RAM 117 includes a text memory 117A, a printing buffer 117B, and a parameter storage area 117E and the like. The text memory 117A stores document data input through the PC 118. The printing buffer 117B stores printing dot pattern such as a plurality of characters and symbols, number of applied pulses representing energy amount for dot forming and the like as dot pattern data, and the print head 23 performs the dot printing according to the dot pattern data stored in the printing buffer 117B. The parameter storage area 117E stores various kinds of calculation data, read (acquired) or written tag identification information (tag ID) of the above-described RFID circuit element To for information transmission and reception.

The I/O interface 113 is connected to the PC 118, the print-head driving circuit 120 for driving the print head 23, a feeding motor driving circuit 121 for driving the feeding motor 119, a cutter motor driving circuit 122 for driving the cutter motor 43, a half cutter motor driving circuit 128 for driving the half cutter motor 129, a tape discharging motor driving circuit 123 for driving the tape discharging motor 65, the transmitting circuit 306 that generates a carrier wave for accessing (reading/writing) to the RFID circuit element To for label production or for information transmission and reception via the antenna LC1 and the antenna LC2 and modulates the carrier wave based on the control signal input from the control circuit 110 and outputs the interrogation wave, the receiving circuit 307 that demodulates a reply wave (reply signal) received from the RFID circuit element To for label production or for information transmission and reception via the antenna LC1 or the antenna LC2 and outputs the signal to the control circuit 110, the mark sensor 127 for detecting the ID mark PM, the cartridge sensor 81 for detecting the mounted status of the cartridge 7, the cutter driving button 16, the LED 91, the monitor 92, the first photo sensor 72, the second photo sensor 62, and the push switch 68.

The transmitting circuit 306 and the receiving circuit 307 are connected to the antenna LC1 and the antenna LC2 being interposed by an antenna duplexer 240 and a switching circuit 86. The switching circuit 86 switches the antenna duplexer 240 to connect to the antenna LC1 or the antenna LC2 based on a control signal from the control circuit 110. To be more precise, the control circuit 110 controls the switching circuit 86 so as, when the label producing process mode is selected as the processing mode, to connect the antenna duplexer 240 to the antenna LC1; and when the external communication process mode is selected as the processing mode, to connect the antenna duplexer 240 to the antenna LC2.

In the control system having the above-described control circuit 110 as the core, when a character data or the like is input through the PC 118, the text (document data) is stored sequentially in the text memory 117A. At the same time, the print head 23 is driven via the driving circuit 120; each of the heating elements is driven selectively to generate heat corresponding to printing dots for one line to print the dot pattern data stored in the printing buffer 117B. And synchronously with this, the feeding motor 119 is controlled via the driving circuit 121 to feed the tape. Also, the transmitting circuit 306 controls to modulate the carrier wave based on the control signal from the control circuit 110 and outputs an interrogation wave, and the receiving circuit 307 processes demodulated signal based on the control signal from the control circuit 110.

FIG. 8 shows the functional structure of the RFID circuit element To for label production or for information transmission and reception.

Referring to FIG. 8, the RFID circuit element To for label production or for information transmission and reception includes the loop antenna 152 that performs contactlessly signal communication with the antenna LC1 or the antenna LC2 on the RFID tag information communicating apparatus 1 and the IC circuit part 151 connected to the loop antenna 152.

The IC circuit part 151 includes a rectification part 153 that rectifies the interrogation wave received by the loop antenna 152, a power source part 154 that accumulates the energy of the interrogation wave rectified by the rectification part 153 as the drive power, a clock extraction part 156 that extracts a clock signal from the interrogation wave received by the loop antenna 152 and supplies the signal to the control part 155, a memory part 157 capable of storing predetermined information signals, a modem part 158 connected to the loop antenna 152, and the control part 155 that controls the operation of the RFID circuit element To via the memory part 157, the clock extraction part 156, and the modem part 158 and the like.

The modem part 158 demodulates the signal received by the loop antenna 152, which is transmitted from the antenna LC1 or the antenna LC2 of the RFID tag information communicating apparatus 1, modulates the reply signal from the control part 155 and transmits the signal as the reply wave (signal including tag ID) via the loop antenna 152.

The clock extraction part 156 extracts a clock component from the received signal and supplies the clock to the control part 155. The clock corresponding to the frequency of the clock component of the received signal is supplied to the control part 155.

The control part 155 performs basic controls to interpret the received signal demodulated by the modem part 158, to generate a reply signal based on information signal stored in the memory part 157 and to reply the signal from the modem part 158 via the loop antenna 152.

FIG. 9 shows an example of an appearance of the RFID label T, on which the information of the RFID circuit element To for label production has been written (or read) by the RFID tag information communicating apparatus 1 having the above-described constitution, and the tag label tape 109 with print has been cut off and finished. FIG. 10A shows a cross-section taken along the line XA-XA' in FIG. 9A, and FIG. 10B shows a cross-section taken along the line XB-XB' in FIG. 9A.

Referring to FIG. 9 and FIG. 10, the RFID label T has a five-layered structure in which the cover film 103 is added to the four-layered structure shown in FIG. 5 including, from the cover film 103 side (upper side in FIG. 9) toward the opposite side thereof (lower side in FIG. 9), the cover film 103, the adhesive layer 101a, the base film 101b, the adhesive layer 10c, and the separation sheet 101d. The RFID circuit element To for label production including the loop antenna 152 provided to the rear side of the base film 101b is included between the base film 101b and the adhesive layer 10c, and on the rear face of the cover film 103, a label print R corresponding to the stored information of the RFID circuit element To for label production is printed (in the embodiment, "RF-ID" indicating the kind of the RFID label T).

As described above, the cover film 103, the adhesive layer 101a, the base film 101b and the adhesive layer 101c have been formed with a half cut line HC (in the embodiment, two of a front half cut line HC1 and a rear half cut line HC2) by the half cutter 34 generally along the width direction of the tape. In the cover film 103, the area sandwiched between the half cut lines HC1 and HC2 is the printing area S where is printed with the label print R. The both sides of the printing area S in the longitudinal direction of the tape sandwiching the half cut lines HC1 and HC2 are front margin area S1 and rear margin area S2 respectively.

In the RFID tag information communicating apparatus 1, which has a basic structure as described above. The standby mode, the label producing process mode and the external communication process mode are provided as the operation modes. In the label producing process mode, the base tape 101 including the RFID circuit element To for label production is fed by the feeding roller 27, information is transmitted and received with the RFID circuit element To for label production via the antenna LC1 to produce the RFID label T. On the other hand, in the external communication process mode, information transmission and reception is carried out with the RFID circuit element To for information transmission and reception located outside the housing 200 via the antenna LC2 to read or write predetermined RFID tag information.

In a normal state after the power for the RFID tag information communicating apparatus 1 is turned on (by operating the power button 14), the apparatus 1 is in the standby mode. In the standby mode, when an instruction signal is input to produce the RFID label T through the PC 118, the apparatus 1 enters into the label producing process mode. Also, in the standby mode, when predetermined conditions are fulfilled (detecting condition of the sensors or the like; which will be described later), the apparatus 1 is switched to enter into the external communication process mode.

FIG. 11 shows control procedure executed by the control circuit 110. Referring to FIG. 11, when the power button 14 is operated and the power is supplied to the RFID tag information communicating apparatus 1, the flow starts (standby mode).

First of all, at step S5, it is determined whether or not a signal of instruction to produce the RFID label T is input from the PC118 via the communication line NW and the I/O interface 113.

When the instruction signal to produce the RFID label T is input, the conditions are fulfilled. The process proceeds to step S100: label producing process mode, and after completing the label producing process, the flow terminates.

On the other hand, when the instruction signal to produce the RFID label T is not input, since the conditions are not fulfilled, the process proceeds to step S10.

At step S10, it is determined if the first photo sensor 72 ("first PS" in FIG. 11) does not detect the light (i.e., the light-shielding detection signal is ON), and at the same time, the second photo sensor 62 ("second PS" in FIG. 11) detects the light (i.e., the light-shielding detection signal is OFF).

When the first photo sensor 72 does not detect the light, and at the same time, the second photo sensor 62 detects the light, the conditions are fulfilled. That is, it is determined that the light is detected by the second photo sensor 62, but around the communication part 61 (including first photo sensor 72) separated from the second photo sensor, the light is shielded by the article M attached with the RFID label Tu (refer to FIG. 3) (i.e., the external communication process mode that performs reading or writing of the information is requested to the RFID label Tu by the operator). Then, the process proceeds to step S200: external communication process mode. After completing the external communication process mode, the flow terminates.

On the other hand, at step S10, when the first photo sensor 72 detects the light or the second photo sensor 62 does not detect the light, the conditions are not fulfilled. That is, it is determined that the operator does not request the external communication process mode by holding up the RFID label Tu, the process returns to the step S5 to repeat the same step.

By executing the above flow, the following control is carried out. That is, in the standby mode, step 5 as determination to proceed to the label producing process mode and step 10 as determination to proceed to the external communication process mode are repeated. Then, according to the instruction input from the PC 118, the process proceeds to the label producing process mode, and based on the detection result of the two photo sensors the process proceeds to the external communication process mode.

FIG. 12 shows the procedure executed at the above described step S100: label producing process mode. As described above, the flow in FIG. 12 starts according to the instruction of the operator to the RFID tag information communicating apparatus 1 through the PC 118.

Referring to FIG. 12, at step S103, a switching control signal is output to the switching circuit 86 to connect the antenna duplexer 240 to antenna LC1 (switch position indicated with "a" in FIG. 7).

Subsequently the process proceeds to step S105. Based on a control signal from the PC 118, a preparation processing such as setting print data, communication data (write data) with the RFID circuit element To for label production, front and rear half cut positions, full cut position and the like are carried out. By carrying out the operation, such as edition of the information necessary for preparation processing and inputting the information through the PC 118, user-friendliness of the system is enhanced.

Subsequently, at step S110, parameters M and N for counting the number of retry (access try number) are reset to the initial value zero. The number of retry is the access try number used in the case that, when the communication is performed from the antenna LC1 to the RFID circuit element To for label production, there is no reply from the RFID circuit element To for label production (refer to FIG. 14).

After that, the process proceeds to step S115, a control signal is output to the feeding motor driving circuit 121 via the I/O interface 113, the feeding roller 27 and the ribbon take-up roller 106 is driven to rotate by a driving force of the feeding motor 119. Further, a control signal is output to the tape discharging motor 65 via the tape discharging motor driving circuit 123 to drive the driving roller 51. As a result, the base tape 101 is fed out from the first roll 102 and supplied to the feeding roller 27. From the second roll 104, the cover film 103 is fed out. The base tape 101 and the cover film 103 are integrally bonded by the feeding roller 27 and the sub-roller 109 and thus, the tag label tape 109 with print is formed and transported.

After that, at step S120, based on the detection signal input from the mark detection sensor 127 via the I/O interface 113, it is determined if the identifier PM of the base tape 101 is detected (i.e., if the cover film 103 has reached to the printing start position of the print head 23). When the identifier PM is detected, the conditions are fulfilled. The process proceeds to the next step S125.

When the identifier PM is not detected (i.e., when the cover film 103 has not reached to the print start position), the step is repeated until the identifier PM is detected.

At the step S125, a control signal is output to the print-head driving circuit 120 via the I/O interface 113, and the print head 23 is electrified. In the printing area S in the above-described cover film 103 (i.e., an area which is generally bonded to the rear face of the RFID circuit element To for label production disposed on the base tape 101 at regular distances), printing of the label print R such as characters, symbols, and bar code corresponding to the print data generated at the step S105 is started.

After that, at step S130, it is determine if the tag label tape 109 with print has been transported to the front half cut position set at step S105 (i.e., if the tag label tape 109 with print has reached to the position where the half cutter 34 of the half cut unit 35 faces the front half cut line HC1 in place). The determination may be made based on, for example, the transportation distance detected after the detection of the identifier PM of the base tape 101 at step S120 measured with a predetermined known method (for example, counting of the pulse number for driving the feeding motor 119 (a pulse motor), which is output by the feeding motor driving circuit 121).

When the tag label tape 109 with print has not reached to the front half cut position, the conditions are not fulfilled. The step S130 is repeated until arrival of the tag label tape 109 is detected.

On the other hand, when the tag label tape 109 with print has reached to the front half cut position, the condition at step S130 is fulfilled. The process proceeds to the next step S135.

At step S135, a control signal is output to the feeding motor driving circuit 121 and the tape discharging motor driving circuit 123 via the I/O interface 113. The drive of the feeding motor 119 and the tape discharging motor 65 is stopped and the feeding roller 27, the ribbon take-up roller 106 and the driving roller 51 are stopped from rotating. With the arrangement, in the process that the tag label tape 109 with print, which is fed out from the cartridge 7, moves toward the discharging direction, in a state that the half cutter 34 of the half cut unit 35 faces the front half cut line HC1 in place set at step S105, the feeding of the base tape 101 from the first roll 102, the feeding of the cover film 103 from the second roll 104 and the transportation of the tag label tape 109 with print are stopped. At this time, a control signal is output to the print-head driving circuit 120 also via the I/O interface 113. Energization of the print head 23 is stopped and the printing of the label print R is stopped (printing stop).

After that, at step S140, a control signal is output to the half cutter motor driving circuit 128 via the I/O interface 113. The half cutter motor 129 is driven to rotate the half cutter 34. The cover film 103, the adhesive layer 101a, the base film 101b and the adhesive layer 101c of the tag label tape 109 with print are cut. Thus, the front half cut processing to form the front half cut line HC1 is carried out.

The process proceeds to step S145, the feeding roller 27, the ribbon take-up roller 106 and the driving roller 51 are driven to rotate as same as the step S115. The transportation of the tag label tape 109 with print is restarted, and the print head 23 is electrified as with the same manner as step S125 to restart the printing of the label print R.

After that, at step S150, it is determined if the tag label tape 109 with print has been fed by a predetermined value (for example, a feeding distance that the RFID circuit element To for label production, which is bonded with cover film 103 with corresponding print, reaches to the antenna LC1). The feeding distance at this time also, same as the step 130, may be determined only by counting the pulses output from the feeding motor driving circuit 121 driving the feeding motor 119 as a pulse motor.

When the tag label tape 109 with print has not been fed by the predetermined value, the conditions are not fulfilled. Step S150 is repeated until the tag label tape 109 is detected to have been fed by the predetermined value.

On the other hand, when the tag label tape 109 with print has been fed by the predetermined value, the condition at step S150 is fulfilled. The process proceeds to next step S300.

At the next step S300, tag access processing is carried out. That is, when the tag label tape 109 has been fed up to the communication position of the RFID circuit element To for label production (a position where the RFID circuit element To for label production faces the antenna LC1 in place), the feeding and printing are stopped and information transmission and reception is carried out. After that, the feeding and printing are restarted to complete the printing. The feeding is further carried out and stopped at the rear half cut position to form the rear half cut line HC2 (refer to FIG. 13).

When step S300 has finished as described above, the process proceeds to step S155 (at this point of time, the feeding of the tag label tape 109 with print is restarted at the step S200). At the step S155, it is determined if the tag label tape 109 with print has been fed to the full cut position (i.e., if the tag label tape 109 with print has reached to the position where the movable blade 41 of the cutting mechanism 15 faces the full cut position set at step S105 in place). The determination may be made with the predetermined known method; i.e., for example, by detecting the feeding distance after the identifier PM of the base tape 101 has been detected at the step S120 (by counting the pulses output from the feeding motor driving circuit 121 driving the feeding motor 119 (pulse motor). When the conditions are not fulfilled, the step is repeated until the tag label tape 109 with print reaches to the full cut position. When the tag label tape 109 with print reaches to the full cut position, the conditions are fulfilled. The process proceeds to the next step S160.

At step S160, same as the step S135, the feeding roller 27, the ribbon take-up roller 106 and the driving roller 51 are stopped from rotating to stop the feeding of the tag label tape 109 with print. With the arrangement, in a state that the movable blade 41 of the cutting mechanism 15 faces the full cut position set at step S105 in place. Then, the feeding of the base tape 101 from the first roll 102, the feeding of the cover film 103 from the second roll 104 and transportation of the tag label tape 109 with print are stopped.

After that, at step S165, a control signal is output to the cutter motor driving circuit 122 to drive the cutter motor 43. The movable blade 41 of the cutting mechanism 15 is driven to rotate to perform the full cut processing. All of the cover film 103, the adhesive layer 101a, the base film 101b, the adhesive layer 101c and the separation sheet 101d of the tag label tape 109 with print are cut and the cut-off line is formed. By cutting off with the cutting mechanism 15, the label shaped RFID label T is cut off from the tag label tape 109 with print. The RFID tag information of the RFID circuit element To for label production is read, and the label shaped RFID label T, which has the corresponding predetermined print is produced.

After that, the process proceeds to step S170. A control signal is output to the tape discharging motor driving circuit 123 via the I/O interface 113. The tape discharging motor 65 is driven again to rotate the driving roller 51. With the arrangement, the transportation by the driving roller 51 is restarted, the RFID label T formed into a label-shape at the step S165 is transported toward the label discharging port 11 and discharged to the outside of the apparatus from the label discharging port 11; and thus the flow terminates.

FIG. 13 shows the procedure of the tag access processing in the above-described step S300.

First of all, at step S310, it is determined if the tag label tape 109 with print has been transported to the communication position with the antenna LC1. The determination also may be made with the predetermined known method same as the step S130 in FIG. 12; i.e., for example, by detecting the feeding distance after the identifier PM of the base tape 101 with print is detected at the step S120.

When the tag label tape 109 with print has not reached to the communication position, the conditions are not fulfilled. The step S310 is repeated until the tag label tape 109 reaches to the communication position.

On the other hand, when the tag label tape 109 with print has reached to the communication position, the conditions at step S310 are fulfilled. The process proceeds to the next step S320.

At step S320, same as the step S135, the feeding roller 27, the ribbon take-up roller 106 and the driving roller 51 are stopped from rotating. In a state that the antenna LC1 generally faces the RFID circuit element To for label production in place, the transportation of the tag label tape 109 with print is stopped. Also energization of the print head 23 is stopped and the printing of the label print R is stopped.

Subsequently, at step S400, between the antenna LC1 and the RFID circuit element To for label production, the information is transmitted and received with wireless communication. Information transmission and reception processing such that the information generated at the step S105 in FIG. 12 is written onto the IC circuit part 151 on the RFID circuit element To for label production (or the information previously stored in the IC circuit part 151 is read) is carried out (refer to FIG. 14).

After that, the process proceeds to step S340, same as the step S145 in FIG. 12, the feeding roller 27, the ribbon take-up roller 106 and the driving roller 51 are driven to rotate and the transportation of the tag label tape 109 with print is restarted. The print head 23 is electrified and the printing of the label print R is restarted.

After that, the process proceeds to step S350, it is determined if the tag label tape 109 with print has been transported to the printing completion position (calculated at the step S105 in FIG. 12). The determination at this time also may be made, for example, same as the above, with the predetermined known method; i.e., by detecting the feeding distance after the identifier PM has been detected at the step S120. Since the conditions are not fulfilled until the tag label tape 109 with print reaches to the printing completion position, the procedure is repeated. When the tag label tape 109 with print reaches to the printing completion position, the conditions are fulfilled. The process proceeds to the next step S360.

At step S360, same as the step S135 in FIG. 12, energization of the print head 23 is stopped and the printing of the label print R is stopped. Thus, the printing of the label print R onto the printing area S finishes.

After that, the process proceeds to step S370. After the label print R has been transported to the predetermined rear half cut position, the rear half cut processing is carried out to form the rear half cut line HC2 with the half cutter 34. Thus, the routine terminates.

FIG. 14 shows the detailed procedure in the step S400. Here, out of the information writing and the information reading, the information writing is described as an example.

Referring to FIG. 14, first of all, at step S405, a control signal is output to the transmitting circuit 306 via the I/O interface 113 to transmit a tag ID read command signal. That is, the transmitting circuit 306 performs a predetermined modulation to thereby generate an interrogation wave for acquiring a stored tag ID of the RFID circuit element To for label production (in this embodiment, the tag ID read command signal as the interrogation signal). The tag ID read command signal is transmitted to the RFID circuit element To for label production as the writing object via the antenna LC1. With the arrangement, the memory part 157 on the RFID circuit element To for label production is initialized.

After that, at step S415, responding to the tag ID read command signal, a reply signal (including tag ID), which is transmitted from the RFID circuit element To for label production as the writing object, is received via the antenna LC1 and taken in via the receiving circuit 307 and the I/O interface 113.

Subsequently, at step S420, based on the received reply signal, it is determined if the tag ID on the RFID circuit element To for label production has been read normally.

When the conditions are not fulfilled, the process proceeds to step S425, one is added to M. Further, at step S430, it is determined if M=5. When M is equal to or less than 4, the conditions are not fulfilled. The process returns to step S405 to repeat the same procedure. When M=5, the process proceeds to step S435 and an error display signal is output to the PC 118 via the I/O interface 113. A corresponding write error display is made and the routine is completed. Thus, even when the initialization is failed, the initialization processing is repeated up to five times.

When the conditions at the step S420 are fulfilled, the process proceeds to step S440. A control signal is output to the transmitting circuit 306 via the I/O interface 113 to transmit a write command signal. That is, the transmitting circuit 306 performs a predetermined modulation to designate the tag ID read at the step S415. An interrogation wave (in this embodiment, a write command signal) for writing a desired data onto the memory part 157 on the RFID circuit element To for label production is generated. Then, the write command signal is transmitted to the RFID circuit element To for label production as the information writing object via the antenna LC1, and the information is written thereon.

After that, at step S445, a control signal is output to the transmitting circuit 306 via the I/O interface 113 to transmit a read command signal. That is, the transmitting circuit 306 performs a predetermined modulation to thereby designate a tag ID read at the step S415 and generates an interrogation wave (in this embodiment, the read command signal) for reading data stored in the memory part 157 on the RFID circuit element To for label production. The read command signal is transmitted to the RFID circuit element To for label production as the writing object of the information via the antenna LC1 to prompt a reply.

After that, at step S450, a reply signal, which is transmitted from the RFID circuit element To for label production as the writing object responding to the read command signal, is received via the antenna LC1. The signal is taken in via the receiving circuit 307.

Subsequently, at step S455, based on the received reply signal, the information stored in the memory part 157 on the RFID circuit element To for label production is checked. It is determined, using a known error detection code (CRC code: cyclic redundancy check or the like), whether or not the transmitted predetermined information is stored normally in the memory part 157.

When the information is not stored normally, the conditions are not fulfilled. The process proceeds to the step S460. One is added to N, and further it is determined if N=5 at step S465. When N is equal to or less than 4, the conditions are not fulfilled. The process returns to the step S440 to repeat the same procedure. When N=5, the process proceeds to the step S435 and causes the PC 118 to display corresponding write error message; and thus, the routine is completed. Even when the information writing fails, retry is repeated up to five times.

When it is determined that the information is stored normally at the step S455, the conditions are fulfilled, the process proceeds to the step S470. At the step S470, a control signal is output to the transmitting circuit 306 to transmit a lock command signal. That is, the transmitting circuit 306 performs a predetermined modulation to thereby designate the tag ID read at the step S415. An interrogation wave (in this embodiment, the lock command signal) is generated to prohibit overwrite of the data stored in the memory part 157 on the RFID circuit element To for label production. The lock command signal is transmitted to the RFID circuit element To for label production as the writing object of the information via the antenna LC1 and prohibits writing of a new information onto the RFID circuit element To for label production. Thus, information writing onto the RFID circuit element To for label production as the writing object is completed.

After that, the process proceeds to step S480. A set of the information on the RFID circuit element To for label production written at the step S440 and corresponding print information of the label print R, which has been printed on the printing area S by the print head 23 is output via the I/O interface 113 and the communication line NW. The information is stored in the information server IS and the route server RS. Upon the requirement, the data is stored in, for example, the database of the respective servers IS and RS so as to be referred by the PC 118. Thus, the routine is completed.

In the FIG. 14, the description has been made taking an example in which the RFID tag information is transmitted to the RFID circuit element To for label production and the information is written on the IC circuit part 151 to produce the RFID label T, and as the information transmission and reception processing, the information writing is performed. However, the information transmission and reception processing is not limited to the above. That is, the information transmission and reception processing is applicable to the following case. That is, the RFID label T is produced while reading the RFID tag information from a read only RFID circuit element To for label production, in which predetermined RFID tag information is previously stored so as not be rewritten, and corresponding print is performed. In this case, as the information transmission and reception processing, only the information reading is performed.

FIG. 15 shows the detailed procedure of the process executed in the external communication process mode in the above-described step S200. The flow in FIG. 15 is, as described above, in the following. The operation will start only when the detection result of the first photo sensor 72 and the second photo sensor 62 becomes the predetermined combination (i.e., non-light detection by the first photo sensor 72; light detection by the second photo sensor 62).

Referring to FIG. 15, at step S205, a switching control signal is output to the switching circuit 86 to connect the antenna duplexer 240 and the antenna LC2 (switching position "b" in FIG. 7).

Subsequently, the process proceeds to step S210. It is determined whether or not the push switch 68 is ON. When the push switch 68 is ON; i.e., when the RFID tag information communicating apparatus 1 is placed in a horizontal position as shown in FIG. 3, the conditions are fulfilled. That is, the process proceeds to the next step S215 based on the present position of the antenna LC2 positioned on the upper part of the housing 200 (state shown in FIG. 3; in this embodiment, this position allows the RFID circuit element To for information transmission and reception to perform both of reading and writing of information).

At step S215, it is determined whether or not, to the RFID circuit element To for information transmission and reception on the RFID label Tu, an instruction has been given by the operator to perform information reading via the PC 118 (the interrogation may be made to the PC118 via the I/O interface and communication network NW). When a read instruction has been given, the conditions are fulfilled. The read processing is performed (refer to FIG. 16) at the step S500; and thus, the flow is terminated. On the other hand, when "read" instruction has not given by the operator through the PC 118, the conditions are not fulfilled. The process proceeds to step S220.

At step S220, it is determined whether or not, to the RFID circuit element To for information transmission and reception on the RFID label Tu, an instruction is given by the operator to perform the information writing through the PC 118 (same as the above, an interrogation may be made to the PC 118 via the I/O interface and the communication network NW). When the write instruction is given, the conditions are fulfilled. The write processing (refer to FIG. 17) is carried out at step S600, and the flow is terminated. On the other hand, when the write instruction is not given, the condition at the step S220 is not fulfilled. The flow is terminated as it is.

On the other hand, in a determination at the step S210, when the push switch 68 is OFF; i.e., when the RFID tag information communicating apparatus 1 is placed in a vertical position, the conditions are not fulfilled. That is, corresponding to the present position of the antenna LC2 positioned on the side face of the housing (state shown in FIG. 2), (in this case, the RFID circuit element To for information transmission and reception is permitted to read only of the information). The process proceeds to the next step S225.

At step S225, same as the step S215, it is determined whether or not, to the RFID circuit element To for information transmission and reception on the RFID label Tu, an instruction is given by the operator to perform information reading via the PC 118 (an interrogation may be made to the PC 118 via the I/O interface and the communication network NW). When the read instruction is given, the conditions are fulfilled. The read processing is performed at the step S500 (refer to FIG. 16) and the flow is terminated. On the other hand, when the read instruction is not given from the PC 118, the conditions are not fulfilled. The flow is terminated as it is.

By carrying out the above flow, when the push switch 68 is ON; i.e., when the RFID tag information communicating apparatus 1 is placed in a horizontal position, the read and write mode is effective. That is, the RFID circuit element To for information transmission and reception is permitted to perform reading and writing of the information via the antenna LC2. Corresponding to the instruction from the PC 118, the mode is selectively switched between the read processing and the write processing. When the push switch 68 is OFF; i.e., when the RFID tag information communicating apparatus 1 is placed in a vertical position, the read mode is effective. The RFID circuit element To the antenna LC2 is permitted to perform read only of the information. Responding to the instruction from the PC 118, the read processing is carried out.

FIG. 16 shows detailed procedure of the read processing in the step S500 in the FIG. 15.

Referring to FIG. 16, first of all, at step S520, a control signal is output to the transmitting circuit 306 via the I/O interface 113 to transmit a tag ID read command signal. That is, the transmitting circuit 306 performs a predetermined modulation to thereby generate an interrogation wave to acquire the tag ID stored in the RFID circuit element To for label production (in this embodiment, a tag ID read command signal as the interrogation signal). Then, the tag ID read command signal is transmitted via the antenna LC2 to the RFID circuit element To for information transmission and reception as the reading object, and a reply is prompted.

After that, at step S530, corresponding to the tag ID read command signal, a reply signal (including the tag ID) transmitted from the RFID circuit element To for information transmission and reception as the reading object is received via the antenna LC2. The signal is taken in via the receiving circuit 307 and the I/O interface 113.

At step S540, it is determined whether or not any error is included in the received reply signal using a known error detection code (CRC code: cyclic redundancy Check or the like).

When the conditions are not fulfilled, the process proceeds to step S550. Then, one is added to K (a parameter used upon a communication error for counting the retry number, which is initialized to zero as the initial value). After that, at step S560, it is further determined if K has reached to a predetermined number of the retry (in this embodiment, up to five times; the other numbers may be appropriately set up). When K≦4, the conditions are not fulfilled. The process returns to step S520 and the same procedure is repeated. When K=5, the process proceeds to step S570. An error display signal is output to the monitor 92 or LED 91 via the I/O interface 113 to display the read failure (error). Then, the flow is terminated.

As described above, even when the read has been failed, the retry is repeated up to a predetermined number of times (in this embodiment, five times). When the failure is repeated up to five times, the read failure (error) is displayed.

On the other hand, when the conditions are fulfilled at step S540, the read of the RFID tag information from the RFID circuit element To for information transmission and reception as the reading object is completed, and the flow is terminated.

FIG. 17 shows the detailed procedure of the write processing at the step S600 in FIG. 15.

Referring to FIG. 17, the flow is the generally same as the tag label producing process, which is performed via the antenna LC1 at the step S400.

That is, first of all, at step S605, same as the step S405, a control signal is output to the transmitting circuit 306 to transmit a tag ID read command signal. That is, the transmitting circuit 306 performs a predetermined modulation to thereby generate an interrogation wave (tag ID read command signal) to acquire the stored tag ID on the RFID circuit element To for information transmission and reception. Then, the tag ID read command signal is transmitted to the RFID circuit element To for information transmission and reception via the antenna LC2. With the arrangement, the memory part 157 on the RFID circuit element To for information transmission and reception is initialized.

After that, at step S615, same as the step S415, responding to the tag ID read command signal, the reply signal transmitted from the RFID circuit element To for information transmission and reception as the writing object, is received via the antenna LC2. Then, the signal is taken in.

Subsequently, at step S620, same as the step S420, it is determined whether or not the tag ID on the RFID circuit element To for information transmission and reception has been read normally based on the received reply signal.

When the conditions are not fulfilled, the process proceeds to step S625 and one is added to M. Further, at step S630, it is determined if M=5. When M is equal to or less than 4, the conditions are not fulfilled. The process returns to step S605 and the same procedure is repeated. When M=5, the process proceeds to step S635 to display a write failure (error); and thus the routine is terminated.

When the condition at the step S620 is fulfilled, the process proceeds to step S640. Same as the step S440, a control signal is output to the transmitting circuit 306 to transmit a write command signal. That is, the transmitting circuit 306 performs a predetermined modulation to thereby designate the tag ID read at the step S615. An interrogation wave (in this embodiment, the write command signal) is generated to write a desired data onto the memory part 157 on the RFID circuit element To for information transmission and reception. Then, the write command signal is transmitted to the RFID circuit element To for information transmission and reception as the writing object of the information via the antenna LC2 and the information is written thereon.

After that, at step S645, same as the step S445, a control signal is output to the transmitting circuit 306 to transmit a read command signal. That is, the transmitting circuit 306 performs a predetermined modulation to thereby designate the tag ID read at the step S615. An interrogation wave (in this embodiment, the Read command signal) is generated to read the data stored in the memory part 157 on the RFID circuit element To for information transmission and reception. Then, the read command signal is transmitted to the RFID circuit element To for information transmission and reception as the writing object of the information via the antenna LC2, and a reply is prompted.

After that, at step S650, same as the step S450, responding to the read command signal, a reply signal transmitted from the RFID circuit element To for information transmission and reception as the writing object is received via the antenna LC2. The reply signal is taken in via the receiving circuit 307.

Subsequently, at step S655, same as the step S455, the information stored in the memory part 157 on the RFID circuit element To for information transmission and reception is checked based on the received reply signal. It is determined, using the known error detecting code, whether or not the predetermined transmitted information is stored normally in the memory part 157.

When the information is not stored normally, the conditions are not fulfilled. The process proceeds to step S660, and one is added to N. Further, it is determined if N=5 at step S665. When N is equal to or less than 4, the conditions are not fulfilled. The process returns to the step S640, and the same procedure is repeated. When N=5, the process proceeds to the step S635 to display a write failure (error); and thus, the routine is terminated.

At the step S655, when the information is stored normally, the conditions are fulfilled. The process proceeds to step S670. At the step S670, same as the step S470, a control signal is output to the transmitting circuit 306 to transmit a lock command signal. That is, the transmitting circuit 306 performs a predetermined modulation to thereby designate the tag ID read at the step S615. An interrogation wave (in this embodiment, the lock command signal) is generated to prohibit overwriting of the data stored in the memory part 157 on the RFID circuit element To for label production. The lock command signal is transmitted to the RFID circuit element To for information transmission and reception as the writing object of the information via the antenna LC2 to prohibit writing new information onto the RFID circuit element To for information transmission and reception. With the arrangement, information writing onto the RFID circuit element To for information transmission and reception as the writing object is completed; and thus, the flow is terminated.

Same as the step S480 in FIG. 14, at the step S640, the information written on the RFID circuit element To for information transmission and reception may be stored in the information server IS or route server RS (in connection with any other information; for example, the tag ID).

The apparatus according to the above-described embodiment can perform the label producing process and the external communication process using the antennas LC1 and LC2. When carrying out the label producing process, the tag label tape 109 with print including the base tape 101 having the RFID circuit element To for label production is transported with the feeding roller driving shaft 108. Then, information transmission and reception to the RFID circuit element for label production is performed via the antenna LC1. The RFID label T is produced using the tag label tape 109 with print, which has the RFID circuit element To for label production, on which the reading/writing has been finished.

On the other hand, when the external communication process is performed, the information transmission and reception is performed with the RFID circuit element To for information transmission and reception, which is located outside the apparatus, via the antenna LC2, to read predetermined information (or, to write predetermined information).

Thus, using a single RFID tag information communicating apparatus 1, both of the production processing of the RFID label T and the external communication process with the RFID circuit element To located outside the apparatus can be carried out. As a result, compared to the case where both of the label producing apparatus and the RFID tag information communicating apparatus are required, the equipment configuration can be simplified and the cost burden on the user can be reduced.

The external communication process with the RFID circuit element To for information transmission and reception located outside the housing 200, is carried out in such manner that the operator brings the object (in the above embodiment: article M), on which the RFID circuit element To for information transmission and reception is attached, closer to a communication range of the loop antenna LC2 for information transmission and reception. Accordingly, relatively large electric power is often required. Therefore, the embodiment is particularly configured so that the mode can be switched between the energization processing mode to start energization for carrying out the information reading or the information writing with the RFID circuit element To for information transmission and reception and energization stop mode to stop energization. With the arrangement, in the RFID tag information communicating apparatus 1 provided with both functions of the label producing process and the external communication process, only when the operator performs the external communication process, at the step S200 in FIG. 11, the mode is switched to the external communication process mode to supply the current. On the other hand, when the external communication process is not performed, the mode is switched to the standby mode or, at the step S100, switched to the label producing process mode to stop the energization for the external communication process. With the arrangement, compared to the case where the switching between energization processing and energization stop is not carried out, the power consumption can be reduced and the energy can be saved. Furthermore, by preventing undesired external communication process operation, such effect that unintended wrong detection can be prevented.

Particularly at this time, the energization is stopped to be in standby mode at the beginning, and when an instruction signal is input, the process proceeds from the step S5 to the step S100: i.e., the label producing process mode. With the arrangement, the power consumption is reduced and the energy can be saved. Further, responding to an input of the instruction signal of label production, the label producing process can be carried out swiftly.

Particularly in the embodiment, the first photo sensor 72 is provided and the apparatus is configured so that, based on its detection result, it is determined whether or not the process proceed to the external communication process mode at the step S10. With the arrangement, in order to carry out the external communication process, the behavior of the operator is detected optically whether or not the object attached with the RFID circuit element To for information transmission and reception is brought closer to the first photo sensor 72, and the mode can be switched between energization and energization stop.

Further, according to the embodiment, particularly at the step S10 in FIG. 11, based on the detection result of, not only the first photo sensor 72 but also the second photo sensor 62, the mode is switched. That is, only when the first photo sensor 72 does not detect the light, at the same time, the second photo sensor 62 detects the light, the process proceeds to the external communication process mode at the step S200. With the arrangement, the light-shielding state due to an article M, which is attached with the RFID circuit element To for information transmission and reception and brought closer to the sensor, can be distinguished from the other light-shielding states (due to a room lamp of the installation site or the like), and the wrong detection can be reliably prevented.

The apparatus according to the embodiment, particularly as shown in FIG. 15, can be switched between the read and write mode that performs both of the information reading and the information writing with the RFID circuit element To for information transmission and reception and the read mode that performs the information reading only. With the arrangement, the operator is permitted to select the optimum mode depending on the use aspect or desired characteristic when performing the external communication process. Particularly, in the information reading mode, by setting the mode so that the information reading only can be carried out and the information writing is prohibited, accidental change or deletion of information already written into the IC circuit part 151 on the RFID circuit element To for information transmission and reception can be reliably prevented. As a result, the user friendliness is enhanced for the operator.

Particularly, according to the embodiment, the mode is switched depending on the position change of the apparatus main body 2 by the operator. In the position that the antenna LC2 is positioned on the upper face of the housing 200, the mode is switched to the read and write mode. In the position that the antenna LC2 is positioned on the side face of the housing 200, the mode is switched to the read mode. With the arrangement, the following advantages are obtained.

That is, when executing the external communication process, if the antenna LC2 is positioned at the upper face of the housing 200, the operator easily recognizes the existence of the antenna. Therefore, the information, which is already stored on the IC circuit part 151 of RFID circuit element To for information transmission and reception, is prevented from being accidentally changed or deleted due to unintended wrong operation. Accordingly, by switching to the read and write mode, both of the information reading and the information writing can be reliably carried out with the RFID circuit element To for information transmission and reception. On the other hand, when executing the external communication process, if the antenna LC2 is positioned at the side face of the housing 200, the operator hardly recognizes the existence of the antenna. Therefore, by switching to the read mode so that, only the information reading can be carried out but the information writing is prohibited with the RFID circuit element To for information transmission and reception. With the arrangement, unintended wrong operation can be reliably prevented. Further, the information, which is already stored in the IC circuit part 151 on the RFID circuit element To for information transmission and reception, can be prevented from being accidentally changed or deleted.

The disclosure is not limited to the above-described embodiment, but various modifications are possible within a range not departing from the gist and technical spirit thereof. Such variations are described below.

(1) When the mode is switched depending on the position change of a part of the apparatus main body That is, in this variation, a part of the apparatus main body 2 is arranged to be capable of changing its position, and according to this change, the mode is switched. The identical elements to those of the above-described embodiment are given with the identical reference numerals and the descriptions thereof will be made briefly or omitted.

FIG. 18 shows the external constitution of the RFID tag information communicating apparatus 1 according to the variation. Referring to FIG. 18, in the apparatus main body 2 of the RFID tag information communicating apparatus 1 of the variation, a part (one side face part) of the housing 200 is the communicating part 96 that transmits and receives the information. The communicating part 96 for transmitting and receiving information includes a turn panel 97, which is attached rotatably to the side face part to open/close as indicated with an arrow C. On the turn panel 97, the antenna LC2, the first photo sensor 72, and the push switch 68 are provided.

The push switch 68 of the variation is arranged so that, when the turn panel 97 is opened is pressed, the push switch 68 pops up and turns ON from the depressed state; and when the turn panel 97 is closed, the push switch 68 is depressed by the housing 200 and turns OFF. In this variation also, same as the above-described embodiment, at the step S10 in FIG. 11, the mode is switched to the external communication process mode depending on the overlapping condition of output of a light-shielding detection signal of the first photo sensor 72 and non-output of a light-shielding detection signal of the second photo sensor 62. Also, at the step S210 in FIG. 15, depending on the ON/OFF of the push switch 68 the mode is switched to the read mode from the step S225 or to the read and write mode from the step S215.

The variation as described above also provides the same effect as the above-described embodiment. Further, when the external communication process function is not used, by closing the turn panel 97, the antenna LC2 can be stored within the apparatus main body 2. An effect that apparatus main body 2 can be reduced in size is obtained when the external communication process function is not used.

(2) Others

In the above embodiment and variation, the second photo sensor 62 is provided. By using the second photo sensor 62, the external communication process mode is prevented from being switched accidentally causing an unintended energization (refer to the step S10 in FIG. 11). Such configuration is effective for further power saving, but it is not always necessary. That is, the second photo sensor 62 may be omitted; at the step S10, based on the detection signal from the first photo sensor 72 only, the mode may be switched to the external communication process mode.

Also, in the above description, the mode is switched to the external communication process mode based on the detection result of the first photo sensor 72 and/or the detection result of the second photo sensor 62. Then, after the process proceeds to the external communication process mode, the mode is switched to the read and write mode or the read mode depending on the ON/OFF of the push switch 68. However, the disclosure is not limited to the above. That is, based on the ON/OFF of the push switch 68, the mode may be switched to the energization processing mode or to the energization stop mode. Contrarily, based on the detection result of the first photo sensor 72 and the second photo sensor 62, the mode may be switched to the read and write mode or to the read mode.

Furthermore, the first photo sensor 72 optically detects the proximity of the RFID circuit element To for information transmission and reception. However in place of this, for example, a sensor, which magnetically detects the proximity, may be used.

In the above description, in the label producing process, the printing is carried out on the cover film 103 separate from the base tape 101 including the RFID circuit element To for label production, and then the film and the tape are bonded to each other. However, the disclosure is not limited to the above. That is, the disclosure may be applied to a printing method in which the printing is carried out on a print-receiving layer (not bonded to the base tape 101) by using a tag tape including the print-receiving layer (for example, a thermal layer of a thermal material which is colored by a heat and capable of forming print; or a layer to be transferred, which is formed of a transfer material capable of forming print from an ink ribbon by means of heat transfer; or an image receiving layer of a image-receiving material capable of forming print by applying ink and the like). Further, the disclosure is not limited to the type in which the read or write of the RFID tag information from the IC circuit part 151 on the RFID circuit element To for label production is carried out, and the print for identifying the RFID circuit element To for label production is carried out by the print head 23. The printing is not always required to be applied. The disclosure may be applied to the case where either one of the reading or writing of the information is carried out.

In addition to the above embodiment and variations, the techniques in the embodiment and variations may be used by appropriate combination thereof.

Although not exemplified in detail, the disclosure may be implemented by adding various modifications within the range of the gist of the disclosure.

What is claimed is:

1. An RFID tag information communicating apparatus, comprising:

a feeding device disposed in a housing constituting a shell of an apparatus main body that feeds a label medium including a tag medium;

an apparatus antenna device that is capable of transmitting/receiving information with a first RFID circuit element provided at said tag medium and a second RFID circuit element located outside said housing, each of said RFID circuit elements being provided with an IC circuit part storing information and a tag antenna transmitting and receiving information; and a read/write control portion that is capable of performing both of information reading and information writing with said first RFID circuit element as well as performing both of information reading and information writing with said second RFID circuit element via said apparatus antenna device an energization mode switching portion that is capable of switching between an energization processing mode for starting energization for performing information reading or information writing with said second RFID circuit element and an energization stop mode for stopping the energization for performing the information reading or the information writing with said second RFID circuit element, wherein said energization stop mode includes a label producing process mode for starting energization in response to an input of an instruction signal to perform tag label producing process by using said tag medium including said first RFID circuit element and;

said energization mode switching portion is capable of switching between said energization processing mode and said label producing process mode.

2. The RFID tag information communicating apparatus according to claim 1 wherein:

said energization mode switching portion includes a proximity detecting device that detects contactlessly proximity of said second RFID circuit element when performing the information reading or information writing with said second RFID circuit element.

3. The RFID tag information communicating apparatus according to claim 2 wherein:

said proximity detecting device is a first optical detecting device that optically detects the proximity of said second RFID circuit element when performing the information reading or information writing with said second RFID circuit element.

4. The RFID tag information communicating apparatus according to claim 3 wherein:

said energization mode switching portion includes a second optical detecting device provided at said apparatus main body separately from said first optical detecting device and switches between said energization processing mode and said energization stop mode depending on detection results of said first and second optical detecting device.

5. The RFID tag information communicating apparatus according to claim 1 wherein:

said read/write control portion performs both of the information reading and information writing with said second RFID circuit element.

6. The RFID tag information communicating apparatus according to claim 1 wherein:

said read/write control portion performs only the information reading with said second RFID circuit element.

7. The RFID tag information communicating apparatus according to claim 5, further comprising a communication mode switching portion that is capable of switching between a read and write mode in which said read/write control portion performs both of the information reading and information writing with said second RFID circuit element and a read mode in which said read/write control portion performs only the information reading with said second RFID circuit element.

8. The RFID tag information communicating apparatus according to claim 1 wherein:
said energization mode switching portion is configured capable of performing mode switching according to a position change of the entire or a part of said apparatus main body.

9. The RFID tag information communicating apparatus according to claim 8 wherein:
said energization mode switching portion includes a switch being switchable according to the position change of the entire or a part of said apparatus main body.

10. The RFID tag information communicating apparatus according to claim 9 wherein:
said apparatus antenna device includes an antenna for label production that performs information transmitting and receiving with said first RFID circuit element and an antenna for external communication that performs information transmitting and receiving with said second RFID circuit element.

11. The RFID tag information communicating apparatus according to claim 10 wherein:
said communication mode switching portion switches to said read and write mode when said apparatus main body is placed in a position that said antenna for external communication is located on the top face side of said housing.

12. The RFID tag information communicating apparatus according to claim 10 wherein:
said communication mode switching portion switches to said read mode when said apparatus main body is placed in a position that said antenna for external communication is located on the side face side of said housing.

13. The RFID tag information communicating apparatus according to claim 10 wherein:
said housing includes a protrusion formed so as to protrude from the surrounding portion thereof and said antenna for external communication is provided at said protrusion.

14. The RFID tag information communicating apparatus according to claim 10, further comprising a shock absorber for protecting said antenna for external communication.

15. The RFID tag information communicating apparatus according to claim 10 wherein:
said housing includes a turning part capable of turning to open/close, and said antenna for external communication is provided at said turning part.

16. The RFID tag information communicating apparatus according to claim 10 wherein:
said housing includes an indication part for indicating installation location of said antenna for external communication.

17. An RFID tag information communicating apparatus, comprising:
a feeding device disposed in a housing constituting a shell of an apparatus main body that feeds a label medium including a tag medium;
an apparatus antenna device that is capable of transmitting/receiving information with a first RFID circuit element provided at said tag medium and a second RFID circuit element located outside said housing, each of said RFID circuit elements being provided with an IC circuit part storing information and a tag antenna transmitting and receiving information; and
a read/write controller that is capable of performing both of information reading and information writing with said first RFID circuit element as well as performing both of information reading and information writing with said second RFID circuit element via said apparatus antenna device
an energization mode switching portion that is capable of switching between an energization processing mode for starting energization for performing information reading or information writing with said second RFID circuit element and an energization stop mode for stopping the energization for performing the information reading or the information writing with said second RFID circuit element, wherein
said energization stop mode includes a label producing process mode for starting energization in response to an input of an instruction signal to perform tag label producing process by using said tag medium including said first RFID circuit element and;
said energization mode switching portion is capable of switching between said energization processing mode and said label producing process mode.

18. The RFID tag information communicating apparatus according to claim 17 wherein:
said read/write controller performs both of the information reading and information writing with said second RFID circuit element.

19. The RFID tag information communicating apparatus according to claim 17 wherein:
said read/write controller performs only the information reading with said second RFID circuit element.

20. The RFID tag information communicating apparatus according to claim 17 wherein:
said RFID tag information communicating apparatus is configured capable of switching between a read and write mode in which said read/write controller performs both of the information reading and information writing with said second RFID circuit element and a read mode in which said read/write controller performs only the information reading with said second RFID circuit element.

* * * * *